United States Patent
Douglas

(10) Patent No.: US 7,513,437 B2
(45) Date of Patent: Apr. 7, 2009

(54) SECURITY MARKING AND SECURITY MARK

(76) Inventor: Joel S. Douglas, 66 Neptune Dr., Groton, CT (US) 06340

( * ) Notice: Subject to any disclaimer, the term of this patent is extended or adjusted under 35 U.S.C. 154(b) by 0 days.

(21) Appl. No.: 12/006,940

(22) Filed: Jan. 7, 2008

(65) Prior Publication Data

US 2008/0135629 A1 Jun. 12, 2008

Related U.S. Application Data

(63) Continuation of application No. 11/029,270, filed on Jan. 5, 2005, now abandoned.

(51) Int. Cl.
*G06K 19/06* (2006.01)

(52) U.S. Cl. .................. 235/492; 235/441; 235/462.01; 257/761

(58) Field of Classification Search ................ 235/492, 235/441, 462.01
See application file for complete search history.

(56) References Cited

U.S. PATENT DOCUMENTS

| | | | |
|---|---|---|---|
| 4,298,217 A | | 11/1981 | Moraw et al. |
| 4,313,984 A | | 2/1982 | Moraw et al. |
| 4,324,421 A | | 4/1982 | Moraw et al. |
| 4,450,024 A | | 5/1984 | Haghiri-Tehrani et al. |
| 4,560,426 A | | 12/1985 | Moraw et al. |
| 4,782,221 A | | 11/1988 | Brass et al. |
| 4,783,823 A | | 11/1988 | Tasaki et al. |
| 4,947,442 A | | 8/1990 | Tenaka et al. |
| 5,159,181 A | * | 10/1992 | Bartels et al. ............... 235/441 |
| 5,169,155 A | | 12/1992 | Soules et al. |
| 5,259,907 A | * | 11/1993 | Soules et al. ............... 156/277 |
| 5,471,039 A | | 11/1995 | Irwin, Jr. et al. |
| 5,508,684 A | | 4/1996 | Becker |

(Continued)

FOREIGN PATENT DOCUMENTS

DE 2163943 7/1972

(Continued)

OTHER PUBLICATIONS

SES Research, Nanotubes, 1999, pp. 1-3, http://www.sesres.com/Nanotubes.asp.*

*Primary Examiner*—Michael G Lee
*Assistant Examiner*—Kristy A Haupt
(74) *Attorney, Agent, or Firm*—Michaud-Duffy Group LLP

(57) ABSTRACT

The application discloses a security mark consisting of a plurality of layers, of which the cover layers are highly conductive films and the layers of the card core are films of varying transparency. One layer carries information, which can be read directly, if desired, above a security print, while the transparent conductive layer has an additional security markings, such as biometric or product identifiers marking which can be read conductively only with the aid of a special reader. All the layers consist of polymers, papers or mixtures which can be fused together to form a laminate which is fused together. The conductive layers form conductive traces which may be formed with single-walled or multi walled nano tubes or they can be formed from multiple layers or dispersions containing, carbon nano tubes, carbon nano tubes/antimony tin oxide, carbon nano tubes/platinum, or carbon nano tubes/silver, carbon, silver or carbon nano tubes/silver-cloride. An alternative layer can be formed from a separate conductive layer or suitable dispersion and the encoding accomplished by overlaying a nonconductive trace.

23 Claims, 12 Drawing Sheets

U.S. PATENT DOCUMENTS

| | | | |
|---|---|---|---|
| 5,522,623 A | 6/1996 | Soules et al. | |
| 5,592,408 A | 1/1997 | Keskin et al. | |
| 5,631,039 A | 5/1997 | Knight et al. | |
| 5,651,615 A | 7/1997 | Hurier | |
| 5,722,893 A * | 3/1998 | Hill et al. | 463/47 |
| 6,010,771 A * | 1/2000 | Isen et al. | 428/209 |
| 6,042,150 A * | 3/2000 | Daley | 283/86 |
| 6,203,069 B1 | 3/2001 | Outwater et al. | |
| 6,217,447 B1 * | 4/2001 | Lofink et al. | 463/12 |
| 6,241,289 B1 | 6/2001 | Kulper et al. | |
| 6,309,724 B1 * | 10/2001 | Kulper et al. | 428/40.1 |
| 6,314,196 B1 | 11/2001 | Yamaguchi et al. | |
| 6,435,408 B1 | 8/2002 | Irwin, Jr. et al. | |
| 6,460,848 B1 * | 10/2002 | Soltys et al. | 273/149 R |
| 6,517,435 B2 | 2/2003 | Soltys et al. | |
| 6,547,151 B1 | 4/2003 | Baldi | |
| 6,560,741 B1 | 5/2003 | Gerety et al. | |
| 6,572,015 B1 | 6/2003 | Norton | |
| 6,610,351 B2 * | 8/2003 | Shchegolikhin et al. | 427/7 |
| 6,652,379 B2 | 11/2003 | Soltys et al. | |
| 6,655,719 B1 | 12/2003 | Curiel | |
| 6,744,367 B1 | 6/2004 | Forster | |
| 6,753,830 B2 | 6/2004 | Gelbman | |
| 6,776,337 B2 | 8/2004 | Irwin, Jr. et al. | |
| 2001/0035822 A1 | 11/2001 | Seidel | |
| 2002/0035170 A1 | 3/2002 | Glatkowski et al. | |
| 2002/0041372 A1 | 4/2002 | Gardner | |
| 2002/0143094 A1 | 10/2002 | Conroy et al. | |
| 2002/0180077 A1 | 12/2002 | Glatkowski et al. | |
| 2003/0008123 A1 | 1/2003 | Glatkowski et al. | |
| 2003/0031861 A1 | 2/2003 | Reiter et al. | |
| 2003/0122111 A1 | 7/2003 | Glatkowski et al. | |
| 2003/0164427 A1 | 9/2003 | Glatkowski et al. | |
| 2004/0026636 A1 * | 2/2004 | Shigeta | 250/556 |
| 2004/0026921 A1 | 2/2004 | Krone et al. | |
| 2004/0099438 A1 | 5/2004 | Arthur et al. | |
| 2004/0101676 A1 * | 5/2004 | Phillips et al. | 428/323 |
| 2004/0213963 A1 * | 10/2004 | Bourdelais et al. | 428/188 |
| 2004/0247832 A1 | 12/2004 | Koops et al. | |

FOREIGN PATENT DOCUMENTS

| | | |
|---|---|---|
| DE | 2308876 | 9/1973 |

* cited by examiner

SECURITY MARKING AND SECURITY MARK

REFERENCE TO RELATED APPLICATIONS

This application is a continuation of and claims priority to U.S. patent application Ser. No. 11/029,270 entitled "Security marking and security mark," filed on Jan. 5, 2005, which claims priority to U.S. Provisional Application No. 60/536,775 entitled "Identity Card," filed on Jan. 15, 2004, the contents of both applications being incorporated herein by reference in their entireties.

FIELD OF THE INVENTION

The present invention relates to a security marking formed from a layer of conductive materials that is patterned so as to have identification information captured therein. The conductive coating layer may be formed by printing, etching, or formulation. The conductive layer can be made from carbon nano tube conductive ink, conductive films or conductive inks formed from metals and oxides, but is not so limited. As will be shown, the conductive coating layer may be applied to security cards, or directly to products to prevent counterfeiting.

In preferred embodiments, the present invention relates to a security marking consisting of several layers of materials. For example, the present security marking may consist of a layer of conductive material sections with an overlying layer of protective material. The positioning of conductive materials in the conductive layer of the security marking carries, at a suitable point, information which serves to identify the card holder or product, and may have additional security markings, such as biometric information or product identification information. The conductive coating layer can be applied to a security card so that the conductive layer and can be formed to have either a single or series of resistors that make the identity tag virtually forgery resistant.

BACKGROUND OF THE INVENTION

Security cards are used as information carriers or data carriers for security markings, identity cards, check cards, credit cards, personal passes, passports, product identifiers and other identification carriers. Security cards must be secure against forgery. Also, it must be easy to check the authenticity of the security cards. Security markings are increasingly manufactured in the form of a fused laminate in which a card core carrying the information is protected by other transparent films.

German Offenlegungsschrift No. 2,308,876 provides an identity card consisting of a relatively thick carrier film and a thin transparent film, between which there is a special paper having internal features, such as watermarks, banknote printings or the like, which serve for protection against forgeries and cause differences in the thickness of the paper. The three layers are plastified together in such a way that the internal features are manually, mechanically and/or visually detectable through the transparent film. Further markings which serve to identify the card holder are provided at a suitable point on this known security marking. For example, a photograph in the form of a film transparency is inserted during plastifying between the special paper and the carrier film and is firmly bonded to the special paper. Furthermore, it is possible, at any desired point on the front or rear of the security marking, to laminate a strip of special paper, printed according to security technology, onto the outside of the plastic material, as a field for later insertion of signatures or other handwritten entries.

Paper has the advantage that numerous latent security markings, such as watermarks, banknote printings, security filaments and the like, can be contained therein, while, by contrast, the material which is used for the manufacture of plastic cards and consists entirely of plastic does not contain any authenticity or security markings of this type. When it is laminated to paper cores, it is unfortunately a disadvantage that these laminations can be opened up relatively easily and are thus accessible to manipulations and forgeries of any kind.

German Auslegeschrift No. 2,163,943 discloses a personal security marking which comprises a combination of a support layer, an electrically conductive layer, a barrier layer, a photoconductive layer with an organic photoconductor, optionally a cover layer, a protective layer on the photoconductive layer or on the cover layer, a protective layer on the rear of the layer support and, optionally, a cover layer on the last-mentioned protective layer. In this personal security marking, a number of different materials are assembled to give a laminate which, due to the lack of homogeneity of the individual layers, can be split up so that it is possible to carry out forgeries.

U.S. Pat. No. 5,592,408 issued to Keskin, et al. describes an identification card and access control device which includes a header piece with stored memory and terminals for interfacing with an electronic port of a reader device, with encoded data programmed into the memory. An identification card, identifying the holder, is attached to the electronic header piece and bears printed information relating to and identifying the intended holder.

U.S. Pat. No. 6,744,367 issued to Forster, describes an identification tag comprising a multilayer assembly incorporating, in sequence, a metal backing layer, a bulk structural layer, a piezo-electric layer and an electrode layer. The electrode layer incorporates antennas structures for receiving interrogating radiation comprising a first radiation component at a relatively lower frequency and a second radiation component at a relatively higher frequency. The electrode layer also incorporates a structure for modulating a second signal generated in response to receiving the second component by a first signal generated in response to receiving the first component to generate a modulated signal which is re-emitted as reflected radiation from the tag. The presence of the tag is determinable from modulation components present in the reflected radiation, thereby distinguishing the tag from other objects capable of reflecting radiation, but not modulating it.

U.S. Pat. No. 6,572,015 issued to Norton, describes a system, apparatus and method for enabling the operation of a vehicle or other equipment by using a smart card for transmitting an authorization code to the vehicle or the other equipment. Without the authorization code from the smart card the vehicle or other equipment is inoperable.

U.S. Pat. No. 6,753,830 issued to Gelbman, describes a flexible electronic label. The electronic label provides for displaying information in connection with a mammal, non-mammal, an item or location. The label includes a display assembly having electronic ink disposed on a support, one or more antennas for sending or receiving signals corresponding to one of instructions, programs, data or selected indicia to be displayed by said display assembly, a storage element in circuit with the antenna for storing the instructions, programs, data and indicia, and one or more processors for intelligently determining the indicia to be displayed by the display assembly, for controlling and coordinating operation of the label, and for generating output signals for instructing the display assembly to display the indicia.

U.S. Pat. No. 6,655,719 issued to Curiel, describes methods of creating tamper resistant informational articles, also related products are disclosed. In one embodiment, a lens has a preformed transparent hologram, metallized portions are provided and may be altered through selective application of heat to predetermined parts thereof to create information which may be fixed or variable. Printing may be provided on the hologram before metallizing. A base portion underlies the metallized layer. In yet another embodiment of the invention, an opaque base portion has a hologram formed in the upper surface thereof with portions of the hologram being made readily visible by partial metallization covering only portions of the hologram with or without information provided as by printing overlying or underlying portions of the metallized sector or both. A transparent overlying lens is secured in overlying relationship. Metallizing may be such as to permit viewing underlying hologram portions or information or not.

U.S. Pat. No. 6,629,591 issued to Griswold, et al. describes a token for use in a cashless transaction involving an electronic device that includes a token body having a coin shape. The token has a digital circuit embedded within the token body and a memory embedded within the token body that is coupled to the digital circuit. The token also includes an input/output interface embedded within the token body that is coupled to the digital circuit and which enables the digital circuit to communicate with the electronic device.

U.S. Pat. No. 5,631,039 issued to Knight, et al. describes a method of manufacture of a security thread suitable for use in security articles including security paper such as that used for banknotes.

U.S. Pat. No. 6,547,151 issued to Baldi, describes a currency note having an identification and/or authentication element including an integrated circuit. The integrated circuit can store, securely in electronic form and accessible from outside, such information as: the value, serial number, issuer, and date of issuance.

U.S. Pat. No. 4,450,024 issued to Haghiri-Tehrani, et al. describes an identification card equipped with an integrated circuit, in which the circuit along with its connection leads is arranged on a carrier element which is embeddedly enclosed by the card on all sides by use of the hot lamination technique.

U.S. Pat. No. 4,298,217 issued to Moraw, et al. describes an identity card consisting of a plurality of layers, of which the cover layers are highly transparent films and the layers of the card core are films of moderate to low transparency, as a result of added pigment.

U.S. Pat. No. 5,169,155 issued to Soules, et al. describes a conventional playing card that is invisibly coded so that it can only be read face down, by an electro-optic reading means.

U.S. Pat. No. 5,651,615 issued to Hurier describes a security device for identifying products that includes a printing medium in which luminescent agents are dispersed, having at least one opaque part disposed on at least one luminescent part of the medium. The opaque part is the same color as the luminescent part and has at least one contour of a different color. When illuminated by predetermined radiation in the non-visible spectrum, the device shows an image different than that observed in ordinary light.

U.S. Pat. No. 6,203,069 issued to Outwater, et al. describes a product authentication system and method employing a unique mark that is simple and cost-effective to apply and read, but provides several layers of protection, including anti-counterfeit and anti-diversion, against counterfeiters. The unique mark includes a bar code that is printed in invisible ink comprising a UV or near-IR ink and an IR mark. The first layer of protection is invisibility. The second layer of protection is the bar code itself. The third layer of protection is the presence of the IR mark in the unique mark. The fourth layer of protection is the IR emitting characteristics of the IR mark.

U.S. Pat. No. 5,471,039 issued to Irwin, Jr., et al., describes a document having printed electronic circuits by using an electronic verification machine that determines the electrical characteristics or signatures of the circuits printed on the document. The electronic verification machine electronically couples with the circuit and applies an excitation signal such as an AC signal having a predetermined frequency to the circuit. A detection circuit in the electronic verification machine then generates a detection signal in response to the excitation signal which represents the characteristics of the circuit printed on the document. The electronic verification machine can also be used to stigmatize the document by applying a signal to the electronic circuits having sufficient strength to alter the electronic circuit.

U.S. Patent application 2001/0035822 applied for by Seidel describes an anti theft tack device incorporating a detectable element which can be attached to the body component of an existing electronic article surveillance security tag to replace the tack-like connecting component of the security tag.

U.S. Pat. No. 5,508,684 issued to Becker, describes a tag circuit system using resonant circuit technology in conjunction with an insulative substrate and conductive ink or metal conductor to permit the tag to be sewn into the clothing, protecting the circuit elements, yet providing a trace on a portion of the tag which can be clipped from the main portion of the tag to change the operation of the tag.

Various gaming applications using optically readable arrays and readers are known such as U.S. Pat. No. 6,460,848 issued to Soltys, et al. Method and apparatus for monitoring casinos and gaming, U.S. Pat. No. 6,517,435 issued to Soltys, et al. Method and apparatus for monitoring casinos and gaming, U.S. Pat. No. 6,652,379 issued to Soltys, et al. Method, apparatus and article for verifying card games, such as blackjack, U.S. Pat. No. 4,782,221 issued to Brass, et al., Printed data strip including bit-encoded information and scanner control.

Biometric information such as a fingerprint can be reduced to a series of terminations or bifurcations (called "minutia") corresponding to various locations on the fingerprint. U.S. Pat. No. 4,947,442 issued to Tanaka, et al. describes a method and apparatus for matching fingerprints in which the collation rate is improved by using both characteristic and non-characteristic minutia for the collation process. An image processing unit used in the apparatus cannot determine whether the collation minutia searched are characteristic or non-characteristic since an Integrated Circuit (IC) card holds a list of collation minutia records, thus offering improved security. Further, random numbers may be utilized for accessing the collation minutia record list for further improved security. However the need to have the data stored on a processing unit increases the cost and complexity.

A standard accepted means of identifying an individual is through their fingerprint or retinal image. Numerous fingerprint algorithms and methods have been proposed and used in existing art such as U.S. Pat. No. 6,314,196 issued to Yamaguchi, et al. which achieves the reliability and simplicity in registering a fingerprint by indicating the quality of a fingerprint image by the number of pseudo minutiae.

U.S. Pat. No. 4,783,823 issued to Tasaki, et al. describes a card and a card identifying apparatus. The card is imparted with predetermined characteristic information in the form of an embossment pattern, a character pattern, a fingerprint pattern, a colored pattern or a combination of selected ones of these patterns, while information corresponding to the predetermined characteristic information is stored in a memory incorporated in the card. Upon insertion of the card into the card identifying apparatus, the latter senses the characteristic information while reading out the corresponding information from the card for collation. When coincidence is found between both sets of information, it is decided that the card is genuine. However the need to have the data stored on a processing unit increases the cost and complexity.

U.S. Pat. No. 6,560,741 issued to Gerety, et al. attempts to eliminate the microprocessor based card and utilizes a two-dimensional, high-density, damage-tolerant printed code suitable for encoding multiple biometrics and text for positive off-line identity verification. The two-dimensional, high-density, damage-tolerant printed code is suitable for printing on a conventionally sized ISO card or other papers used in verifying identity. An ISO-sized card or other identity paper bearing a two-dimensional, high-density, damage-tolerant printed code encoding multiple biometrics, e.g., encoded image likeness and multiple fingerprint templates, may be used with an off-line integrated positive identity verification apparatus that is capable of decoding the image and fingerprint samples taken from an individual whose identity is sought to be verified. However, since the two dimensional code can be read by conventional means the two dimensional code can be readily forged because it does not have a built in verifying mechanism to allow the reader to check for authenticity.

U.S. Pat. No. 5,522,623, Soules, et al., describes an apparently conventional document such as an identification (ID) card that is constructed as a laminate within which a code or other coding indicia such as a photograph, bar code or fingerprint is concealed from human view. The document is read by a conventional electro-optic reader means placed against a face of the card. The reader uses a beam of light in the wavelength absorbed by the material with which the coded indicia is produced, but reflected by the background against which the coded indicia is "seen" by the beam. The card is preferably a laminate of at least an upper lamina and a lower lamina, each made of a synthetic resin which has a substantially white imprintable surface conventionally printed with the identification of the owner of the card with a pigment-free, non-aqueous ink which is visible to the human eye but substantially transparent to wavelengths outside the visible range. Typically, both the upper and lower laminae, are opaque to visible light, but the face through which the coded indicia is to be read by the reader, is transparent to the reader's beam. The code is read because there is sufficient contrast between the transmitted and absorbed light in the wavelength used by the reader. Each of the forgoing patents are hereby incorporated herein by reference in their entirety.

Various gaming applications using optically readable arrays and readers are also seen in U.S. Pat. No. 6,460,848 issued to Soltys, et al. entitled Method and Apparatus for Monitoring Casinos and Gaming; U.S. Pat. No. 6,517,435 issued to Soltys, et al. entitled Method and Apparatus for Monitoring Casinos and Gaming; U.S. Pat. No. 6,652,379 issued to Soltys, et al. entitled Method, Apparatus and Article for Verifying Card Games, Such as Blackjack; and U.S. Pat. No. 4,782,221 issued to Brass, et al., entitled Printed Data Strip Including Bit-Encoded Information and Scanner Control.

The prior art is replete with identification and verification systems; however the need exists for a low cost and simple security marking system which can be used as an individual identification system, gaming mark or a security mark for product identification of forged or non licensed replicas.

SUMMARY OF THE INVENTION

The present invention provides an identity marking formed from a layer of conductive materials that is deposited or formed in a pattern so as to represent encoded identification information. The marking can be applied to a security card, or to a product label. The pattern of conductive material sections in the identity marking represents the security information encoded therein. The security code in the conductive layer of the marking is read by a reader that measures or verifies conductivity.

It is an advantage of the present invention to provide an improved security marking system which can be used as an individual identification system, gaming mark or a security mark for identification of forged or non licensed product replicas.

In preferred embodiments, the present invention provides security marking comprising at least one layer of conductive material which withstands any attempt to forge the information encoded thereon and thus resists any attempted forgery of the information fixed in the conductive layer of the security marking.

In accordance with the present invention, an algorithm which registers a fingerprint by indicating the quality of a fingerprint image by pseudo minutia can be used with the present invention to capture the fingerprint information in the conductive material and using this image as an identification system.

In accordance with the present invention, the layer of conductive material can comprise numerous materials, including, but not limited to, conductive inks, plastics and coatings.

The present invention provides, a security marking having a single layer of conductive material containing at least one element of conductively readable identifying indicia. This conductive layer can be made by applying a conductive film to the surface of a security card or to a product "tag". The conductive layer is formed from a film that has a surface resistance in the range of less than about 150,000 ohms/square, or more preferably about 25,000 ohms/square.

In preferred aspects, the layer of conductive material can be formed from a variety of conductive films, coatings or inks, including, but not limited to those described in U.S. patent application 2002/0143094 entitled Polymer Nanocomposites and Methods of Preparation, Conroy, Jeffrey L., et. al.; U.S. patent application 2002/0035170 entitled Electromagnetic Shielding Composite Comprising Nano Tubes, Glatkowski, Paul; et al; U.S. patent application 2002/0180077 entitled Carbon Nano Tube Fiber-Reinforced Composite Structures for EM and Lightning Strike Protection, Glatkowski, Paul; et al; U.S. patent application 2003/0008123 entitled Nanocomposite Dielectrics, Glatkowski, Paul; et al; U.S. patent application 2003/0164427 entitled ESD Coatings For Use With Spacecraft, Glatkowski, Paul; et al; and U.S. patent application 2003/0122111 entitled Coatings Comprising Carbon Nano Tubes and Methods For Forming Same, Glatkowski, Paul; et al; all included herein by reference. The dispersion that form the conductive material can be further comprising a plasticizer, softening agent, filler, reinforcing agent, processing aid, stabilizer, antioxidant, dispersing agent, binder, a cross-linking agent, a coloring agent, a UV absorbent agent, or a charge adjusting agent.

In preferred embodiments, the present conductive coating layer can also be made from single wall or multi wall carbon nano tubes that may preferably be sized to be less than 3.5 nm and greater than 0.1 nm in outer dimension size. In optional embodiments, additional conductive dispersions such as Acheson Electrodag 427 or Antimony Tin Oxide (ATO) ink can be alloyed with either single wall or multi wall carbon nano tubes preferably sized to be greater than 3.5 nm and less than 15 nm in outer dimension size. In preferred embodiments, the carbon nano tubes can be mixed uniformly into the Acheson Electrodag 427 such that their percent by weight is between 0.5 to 10%. Alternately, they may be applied as a first layer of a two part coating. Preferably the carbon nano tubes are added such that they make up 3% by weight of the mixture. The nano tubes are preferably present in the film from about 0.001 to about 10% based on weight. The present nano tubes may be selected from the group consisting of single-walled nano tubes (SWNTs), double-walled nano tubes (DWNTs), multi-walled nano tubes (MWNTs), and mixtures thereof. Optionally, platinum nano particles can be added and mixed uniformly to the conductive coating layer such that their percent by weight is between 0.5 to 10%. Preferably the platinum nano size particles are added such that they make up 4% by weight of the mixture.

Additional traditional conductive films such as conductive carbon based inks, silver inks, metal oxides based inks where the metal oxides are selected from tin-indium mixed oxide (ITO), antimony-tin mixed oxide (ATO), fluorine-doped tin oxide (FTO) or aluminum-doped zinc oxide (FZO) and conductive plastics such as those produced by Bayer or Southwall Technologies Altair M10 can be used to form the conductive layer. The dispersion further comprising conductive organic materials, inorganic materials, or combinations or mixtures thereof. The conductive organic materials are selected from the group consisting of buckeyballs, carbon black, fullerenes, nano tubes with an outer diameter of greater than about 0.5 nm, and combinations and mixtures thereof. Additionally conductive inorganic materials used to form useful conductive films can be selected from the group consisting of antimony tin oxide, iridium tin oxide, aluminum, antimony, beryllium, cadmium, chromium, cobalt, copper, doped metal oxides, iron, gold, lead, manganese, magnesium, mercury, metal oxides, nickel, platinum, silver, steel, titanium, zinc, and combinations and mixtures thereof.

In preferred embodiments, the layer of conductive material sections is patterned so as to form resistors. The resistors can be formed either by modifying the conductive makeup of the regions of conductive material in the conductive layer or the resistors can be formed by printing or etching of the conductive coating to form the resistance features on a security card or product tag. Additionally, these resistors can be formed by printing with conductive inks. Applicable printing methods include spray painting, dip coating, spin coating, knife coating, kiss coating, gravure coating, screen printing, ink jet printing, and pad printing or other printing means or by either chemical or mechanical means such as using a Versa Laser made by Universal Laser Systems of Phoenix, Ariz., to remove the conductive material to form non conductive areas. Once the resistors are formed by the pattern of conductive materials in the conductive layer, then the security information or identification can be marked into or onto the conductive layer. In preferred embodiments, the code that is marked on or into the conductive layer can represent biometric information for use with an identity card, gaming value or lottery ticket information for gaming applications or product/manufacture information when used as a product identifier.

Another security issue that has not been effectively handled by existing marking technology is the grey market diversion and authentic licensed material. Grey market material is a problem in the high value consumer goods market where manufacturers distribute the products at different price points to different markets due to various pressures such as price controls in a market. Authentic licensed material such as sports logo materials are regularly copied and the licensing fees not paid. A better way of discretely identifying the product is needed to minimize these problems.

An advantage of the present security marking is that it an be used in packaging applications such as tamper proof seals or package identification to assist manufacturers to identify their products. Specifically, the conductive layer can be encoded with information such as lot, destination (country to be exported to), manufacturing date, or other useful information so that a manufacture or retailer can quickly determine if the product is "grey market" or authentic. Advantageously, the security code or marking in the conductive layer is not readable to the consumer, however, such conductive layer is machine readable. Moreover, as the conductive layer may be transparent, it does not block visual indicia (e.g.: a photograph) therebelow. In preferred embodiments, the transparent conductive layer may include an ink like Acheson Electrodag 427 or conductive films, coatings or inks such as described in U.S. patent application 2002/0143094 entitled Polymer Nanocomposites and Methods of Preparation, Conroy, Jeffrey L.; et al.; U.S. patent application 2002/0035170 entitled Electromagnetic Shielding Composite Comprising Nano Tubes, Glatkowski, Paul; et al; U.S. patent application 2002/0180077 entitled Carbon Nano Tube Fiber-Reinforced Composite Structures for EM and Lightning Strike Protection Glatkowski, Paul; et al; U.S. patent application 2003/0008123 entitled Nanocomposite Dielectrics, Glatkowski, Paul; et al; U.S. patent application 2003/0164427 entitled ESD Coatings for Use with Spacecraft, Glatkowski, Paul; et al; and U.S. patent application 2003/0122111 entitled Coatings Comprising Carbon Nano Tubes and Methods for Forming Same, Glatkowski, Paul; et al. Therefore, determining the authenticity or whether the product has been diverted from another market is easily accomplished by the present invention since the security marking in the conductive layer (i.e.: the pattern of conductive sections making up the conductive layer) can be read by a conductivity meter, yet is not optically visible to an observer with the naked eye due to the transparent nature of the conductive material.

In optional embodiments of the present invention, the conductive inks or coatings can also be impregnated or printed onto a primary packaging material. The ink or coating could be formulated to provide a specific resistance so that the product could be easily identified by resistive readings of the package. Specifically, a resistance reader can be used to identify the package.

In an alternate embodiment, the encoding on the security marking is customized for gaming applications. For example, a similar coding method as used in the biometric coding application described above is used, but instead using a typical gaming card deck as the information which is converted into a pixel code. In preferred embodiments, the system has redundant encryptions and this eliminates the possibility of forgery and requires the card reader to initiate start of game and end of game. Start of game is when the shoe or shuffler is loaded and end of game is at the end of the playable cards or can be signaled by the dealer. The wrapper for each deck has the card deck code on it and that is entered into the card reader to allow it to validate the card deck. This provides a machine readable conductive system that is tamper resistant. Advantageously, such system need not be readable by optical means.

In various embodiments, the invention can also be extended to identifying and controlling high value products. For example, the conductive layer can be used to store product, manufacturer, lot and manufacturing facility identifiers such that a product can be verified as authentic and or licensed. Such an intelligent tag with the anti forgery properties in the conductive layer would help the manufacturer identify both diverted and grey market products. Optionally, the layer of conductive material can be applied to a tag or integrated into a logo by coating an embossing thread with the conductive material which will act as a conductive tag. Optionally as well, the conductivity of the tag can be controlled by the amount of conductive media that is in the ink.

The reading of the encoded conductive material could be accomplished by a reader similar in design to U.S. Pat. Nos. 6,776,337, 6,435,408 or 5,471,039 all issued to Irwin, Jr., et al. which provides a means for the determination of the authenticity and integrity of various types of documents such as lottery tickets accomplished by using an electronic verification machine to compare data contained in electronic circuits printed on the document to document data printed on the document. The electronic circuits are printed on the document in conductive or semiconductive ink using, for example, the gravure printing process, and the presence and status of the circuits can be used to verify or authenticate the document. Data can be represented in the electronic circuits by the electrical signature of the circuit which is measured by the electronic verification machine. In the case of lottery tickets, a ticket can be validated by having the electronic verification machine determine which play spots have been removed from the ticket and comparing data on the ticket with the removed play spots to determine a play redemption value for the ticket. Document verification or lottery ticket validation can also be accomplished by transmitting signature data from the electronic circuits via the electronic verification machine to a central computer for comparison with document data.

In various embodiments, the conductive layer can be used with a traditional radio frequency identification device (RFID). For example, a microprocessor or ASIC (application specific integrated circuit) can be embedded in the card and identification information can be captured in the conductive material in communication with the microprocessor or ASIC. The conductive material can be etched to form a reference resistor and a series of information resistors on the card. The reference resistor provides the RFID, and the reference resistor and the information resistors can be arranged such that the information contained in the conductive material is readable by testing the resistance of the applicable encoded line of information resistors. Optionally, the conductive material can also be formed such that an antenna for the RFID device is formed from the same conductive material as the each information line.

Other objects, features and advantages of the invention will become apparent from the following detailed description of preferred embodiments, when considered in light of the attached figures of drawing.

Figure 1:
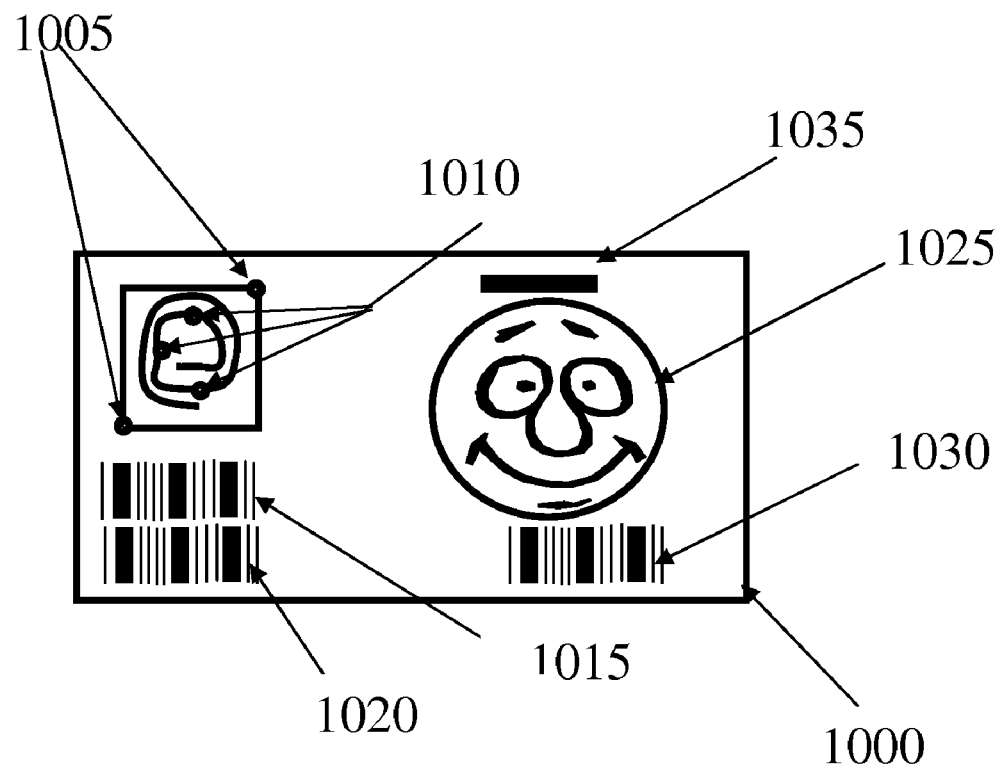
FIG. 1 is a view of a security card according to the invention with diagrammatically indicated information and a security marking thereon.

DETAILED DESCRIPTION OF PREFERRED EMBODIMENTS (a) General Description:

The present invention provides a security marking or identity "tag" that can be affixed to a security card, or to a product label, or to a product itself. In one embodiment of the invention, the identity tag is composed of at least two layers wherein one layer carries identification information such as the name, photograph and personal reference number, and the other layer carries additional latent security markings represented by a layer comprising a pattern of conductive materials either inscribed in or printed thereon. The two individual layers of the security marking may have different transparencies. For example, the first of the two layers may comprise the core (i.e.: main body) of a security card, and have a matt, preferably white, coloring as a result of added pigment with moderate to low transparency. By contrast, the conductive layer of the security marking may have a very high transparency. Therefore, the conductive layer may be applied directly over the core layer of the security card, without blocking visual reading of the indicia (e.g.: photographs) on the core layer of the security card.

The conductive material sections in the conductive layer may be formed from various conductive films, inks or dispersions, and may have a wide variation in transparency going from opaque to highly transparent. The formulation of the conductive layer is important to achieve the desired conductivity of the layer when it is cured to form part of the security tag. In preferred embodiments, the identification security information is inscribed into the conductive material layer in areas which are conductive and areas which are conductively isolated. One preferred embodiment of the conductive layer includes the formation of a resistor or series of resistors that can be verified. The present invention includes mechanical formation of the resistor by printing or mechanical removal of material and includes both providing a reference resistor and a series of resistors. In one embodiment, the reference resistor is a single resistive shape formed in the conductive coating layer. This reference resistor can be used by a conductive reader to determine a base line resistance so that the base line resistance can be compared to the design and the series is interpreted based on the base line resistor. For example, the patterned sections of conductive material can be formed into a series of resistors, each having a pre-determined resistance.

For example, each resistor can be formed to have a 5 ohm resistance. When the conductivity meter reads a 50 ohm resistance, it knows there are 10 resistors on the card. Similarly, if the conductivity meter reads a 40 ohm resistance, it knows there are 8 resistors on the card. This provides a means of locking the data to prevent forgery. Alternatively security information can be stored in the series of resistors to provide a verification system when used with a traditional smart card microprocessor for verification of the security card. For example the resistance of the reference resistor can be measured and at least one referenced series resistor is inscribed on the tag. The resistance of the reference resistor can be measured and then the resistance of the series resistors can be measured with the resultant resistance of the series divided by the reference resistant values to yield the digital value of the series resistor. Additionally, a code such as a binary code that uses areas of conductivity versus areas of non conductivity to capture information can be either inscribed or printed as part of the layer of conductive material. This code can be used to provide an identity marking for the security marking tag. This marking can be either biometric information for an identity card or lot and manufacture information for a product identity tag. The code used needs to be devised such that forgery or modification to the tag is prevented. One system of accomplishing this for personal identity cards is to encode the biometric information on the card and to use serial encryption of this biometric information to minimize the ability of a forged identity tag.

Alternatively the conductivity of the conductive layer can itself be used as the identifier. For example the conductivity can be changed by varying the conductive materials in the conductive layer. For example a card, package or tag for a specific application could be pre-set so that its conductivity is 150 ohms squared whereas in another tag or application the conductivity is 300 ohms squared. A valid ID for the first application would require a conductivity reading of approximately 150 ohms squared and a material with greater than or less than the 150 ohms square read would be invalid.

In addition to storing biometric information the conductive material can be used to store product, manufacture, lot and manufacturing facility identifiers such that a product can be verified as authentic and or licensed. A security marking tag containing product identification information could be attached to the product or labeling or it could be incorporated into the product itself. This would make a forged product easier to identify and could be used to determine if a product is diverted such as a grey market product. The security marking tag could contain the market or channel information on the tag and or the manufacturing lot information to help identify the product if it was to be inspected.

In addition to conductive materials such as carbon nanotubes, carbon, silver, platinum, tin-indium mixed oxide (ITO), antimony-tin mixed oxide (ATO), fluorine-doped tin oxide (FTO) or aluminum-doped zinc oxide (FZO) and conductive plastics such as those produced by Bayer or Southwall Technologies Altair M10 the conductive layer may also incorporate polymeric materials selected from the group consisting of thermoplastics, thermosetting polymers, elastomers, conducting polymers and combinations thereof or a material selected from the group consisting of polyethylene, polypropylene, polyvinyl chloride, styrenic, polyurethane, polyimide, polycarbonate, polyethylene terephthalate, cellulose, gelatin, chitin, polypeptides, polysaccharides, polynucleotides and mixtures thereof, or ceramic hybrid polymers, Ethylene Glycol Monobutl Ether Acetate, phosphine oxides and chalcogenides. The conductive coatings can also be formed from carbon nano tubes, carbon nano tubes/antimony tin oxide, carbon nano tubes/platinum, or carbon nano tubes/silver or carbon nano tubes/silver-cloride dispersion or coating. The small size permits the formation of surface texture less than 0.33 microns. Additionally conductive dispersions such as Acheson Electrodag 427 Antimony Tin Oxide (ATO) ink can be alloyed with either single wall or multi wall carbon nano tubes preferably sized to be greater than 3.5 nm and less than 20 nm in outer dimension size. The carbon nano tubes may be mixed uniformly into the Acheson Electrodag 427 such that the percent by weight is between 0.5 to 10%. Preferably the carbon nano tubes are added such that they make up 3% by weight of the mixture. The nano tubes used by the aforementioned conductive materials are selected from the group consisting of single-walled nano tubes (SWNTs), double-walled nano tubes (DWNTs), multi-walled nano tubes (MWNTs), and mixtures thereof. Additionally platinum nano particles can be added and mixed uniformly to the coating such that the percent by weight is between 0.5 to 10%. Preferably the nano size platinum are added such that they make up 4% by weight of the mixture. Alternatively to produce a system of reading the security card without contacting it, the conductive material can be mixed with fluorescence dye and binary numbers can be written in the fluorescence dye. This allows non contact optical reading of the card while the conductive contact reading of the conductive material verifies the card authenticity.

Additional traditional conductive films such as conductive carbon based inks, silver inks, metal oxides based inks (where the metal oxides are selected from tin-indium mixed oxide (ITO), antimony-tin mixed oxide (ATO), fluorine-doped tin oxide (FTO) or aluminum-doped zinc oxide (FZO)) and conductive plastics such as those produced by Bayer or Southwall Technologies such as Altair M10 can be used to form the conductive layer. The aforementioned patents and materials are hereby incorporated herein by reference in their entirety.

Alternatively to produce a system of reading the card without contacting it the conductive material can be mixed with fluorescence dye and the codes can be written in fluorescence dye. This allows non contact optical reading of the card while the conductive contact reading of the conductive material verifies the card authenticity.

Alternatively the conductive material layer can be used with a traditional radio frequency identification device (RFID). In this embodiment, a microprocessor or ASIC (application specific integrated circuit) is embedded in the card and identification information is captured in the conductive material in communication with the microprocessor or ASIC. The conductive material can be etched so that there is a reference resistor and a series of information resistors etched on the card. The reference resistor provides the RFID, the reference resistance and the information resistors are arranged such that the information contained in the conductive material is readable by testing the resistance of an applicable encoded line of information resistors. The conductive material layer can also be formed such that the antenna for the RFID device is formed from the same conductive material as the each information line.

In addition to having a consistent and repeatable coating the present system of representing identity information by the positioning of regions of conductive material can be such that attempts at adding or deleting encoded data by adding or removing regions of conductive material voids the data stored in the identity marking. To accomplish this, data can be written by etching, engraving, printing or spraying the appropriate patterns on the tag.

For example a preferred means of encoding a fingerprint onto a card of the present invention is discussed below. In one embodiment of the invention, the card is composed of at least two layers, of which one layer carries the information which directly serves for identification, such as the name, photograph, color code or personal reference number, and the other layer comprises regions of conductive material that are positioned on the card to represent additional conductive security markings. The individual layers of the identity card can have different transparencies; thus, for example, one of the two layers of the card core has a matt, preferably white, coloring as a result of added pigment and accordingly has a moderate to low translucent. By contrast, the upper cover layer of patterned conductive material of the identity card has a very high translucent conductive coating which is etched or printed to create a coated indicia for the card. The positioning of conductive materials in layer of translucent cover layer such as described above represents, information which serves to identify the card holder, and the colored lower layer has additional security markings, such as figures, as a protective measure against forgeries.

In another preferred embodiment, the packaging material of the product may have the conductive layer embedded therein. For example carbon nano tubes or other conductive material could be mixed with the papers or fibers or box materials of the packaging and this would make the paper conductive for verification of the authenticity of the document or packaging. This technique would be useful for the marking of treasury bills, documents, high value packages etc.

In a further embodiment of the invention, the security marking of the present invention can consist of a single layer used to validate the authenticity of a security card by providing a machine readable marking that is transparent to the customers. This is useful in gaming establishments to validate card decks.

In a further embodiment of the invention the conductive coating is encoded with security information determine if the document or gaming piece is valid by a reader testing the resistance level of a portion of the coating or over the whole area.

In a further embodiment of the invention the conductive coating is replaced with a conductive film and the encoded information is punched into the film.

In a further embodiment of the invention the conductive coating is replaced with a conductive film and the encoded information is punched into an over laying film and the film is adhered to the conductive layer.

In a further embodiment of the invention the conductive coating is replaced with a conductive film and the encoded information is printed with non conductive ink over the film so that it adhered to the conductive layer forming the encoded area.

In a further embodiment of the invention the conductive coating is coated on thread that is used to form the logo on apparel: In this embodiment of the invention, the conductivity of the thread can be used by the manufacturer to determine if the apparel was made for that market or if it was diverted. A resistance (or conductivity) reader testing the resistance level of a portion of the coated logo or over the whole area is used to determine the authenticity and if it was diverted from another market. The conductivity in the conductive layer of the security marking can be set at a specific level corresponding to a specific destination or territory. This can be used to determine the authenticity of the item.

In a further embodiment of the invention the conductive coating is applied to a security card or identity tag in a two step process, wherein the first step is to form the conductive layer and the second step is to form an optional polymer cover layer.

In a further embodiment of the invention the conductive coating is applied to a security card or identity tag in a one step process. (IE: the conductive layer is formed without a cover layer).

In a further embodiment of the invention the encoding of the security information is performed with binary numbers.

In a further embodiment of the invention the encoding of the security information is performed with bar codes.

In a further embodiment of the invention the binary numbers are written with fluorescence dye that is incorporated into the conductive layer.

In a further embodiment of the invention the binary numbers are written with infrared dye that is incorporated into the conductive layer.

In a further embodiment of the invention the bar codes are written with infrared dye or fluorescence dye.

In a further embodiment of the invention the security information codes are written back ground ink. For example, a security card may be covered with transparent conductive ink and then using a standard laser printer for quick identification at trade shows, office buildings, etc.

In a further embodiment of the invention the conductive material can be mixed with fluorescence or infrared dye and the security information can be encoded in fluorescence dye bearing material. This allows non contact optical reading of the security card while the conductive contact reading of the conductive material layer is used to verify the card authenticity.

In a further embodiment of the invention the binary numbers are written in infrared dye or fluorescence dye. If a fluorescence or infrared dye was used then the system does not require a contact reader. A digital encoding method using a non-contact infrared dye reader can be used.

Fingerprint identification can be accomplished simply by analyzing the fingerprint for the end of a ridge point (terminations) or the merger of two ridge points (bifurcations). Bifurcations and terminations are called minutia points. The set of minutia points constitute the features characterizing a fingerprint. The matching of two fingerprints is based on comparing the locations of the minutia points.

Utilizing such minutia points provides the present security marking with two alternate systems for capturing and verifying the fingerprint information. In either system, the fingerprint is not replicated on the card but the information describing the unique characteristics of the fingerprint can be captured on the card.

In the first system, the card uses graphical information regarding the relative location of the minutia and specific location and type information (location and whether a bifurcations and terminations) that is contained in a corresponding serial code. In the second system, the card uses graphical information regarding the relative location of the minutia and specific type information (whether a bifurcations and terminations) that is contained in a corresponding serial code.

In preferred embodiments, the security card will have a region reserved for fingerprint identification information and that information will be specific to the individual for whom it is issued.

(b) Preferred Embodiments

Creating the Card:

In one embodiment, the security card is formed with a pattern of conductive material regions that are positioned on the card in a serial code format to represent fingerprint minutia type and location. The pattern of conductive material locations also provides a reverse image plot that provides the relative location of the minutia points. A fingerprint capture algorithm and associated equipment can be used to scan the fingerprint and calculate the minutia information with regards to location and bifurcations or termination type (see FIG. 1A). For example, the software calculates the x and y location of the bifurcations and terminations and identifies the fingerprint. The location and type data of the fingerprint minutia can then be converted to a serial code that will have the location information of the minutia and the type of minutia for each point, being either a bifurcation or a termination. The location data may be converted into a reverse image to plot the relative location of the minutia points on the card.

The card is then formed with a bar code having both location and minutia type and a reverse image of the minutia points thereon. In a preferred embodiment, the security information is encoded by the position of conductive material sections formed in a conductive layer of the card.

Figure 1A:
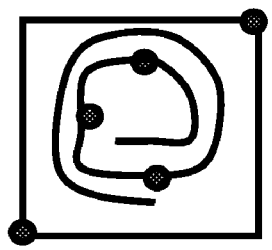
FIG. 1A is an illustration of a fingerprint showing fingerprint minutia.

A typical two layer security card 100 is shown in FIG. 1. Card 1000 is formed from a standard security card body such as a driver's license or credit card (that may optionally be made of a plastic laminate). In accordance with the present invention, regions of conductive materials cover areas of the security card body. This upper covering layer of conductive material is preferably transparent such that the information on the security card body can be read through the layer of conductive material. In accordance with the present invention, security information is stored on both the security card body, (e.g. in the form of a photograph or magnetic strip) and also in the covering layer of conductive material (as determined by the positioning of individual sections of conductive material).

As will be explained in detail, certain regions of card 1000 have a layer of conductive material deposited thereon or otherwise applied thereto. The particular pattern formed by these conductive material deposits may be used to encode security information. For example, card 1000 may have reverse image alignment points 1005 formed by regions of of conductive or non-conductive material and fingerprint minutia points 1010 also formed by regions of conductive or non-conductive material on the security card. Minutia locations and type may also be written in a serial code 1015 on the conductive layer of the security card. Specifically, such a serial code may be formed by a pattern of regions of conductive material deposited in a line. The serial code is read by a conductivity meter detecting the presence (or absence) of individual regions of conductive material in the line. A serial code is any code that is written serially so that the information is stacked and new information can not be inserted in between the code. The Minutia type is written again in a different serial code 1020 on the conductive layer of the security card. Security card 1000 can also contain a pattern of conductive or non-conductive material deposits forming security code 1030, a picture 1025 on the underlying body of the security card and a security resistor 1035 formed by the conductive material. Security resistor 1035 may be etched or printed on card 1000 to provide a resistive identifier for the card. In operation, the resistance of resistor 1035 is matched within a tolerance of acceptable resistances and configuration for a particular class of security cards.

Verifying Identity Using the Card

Figure 2:
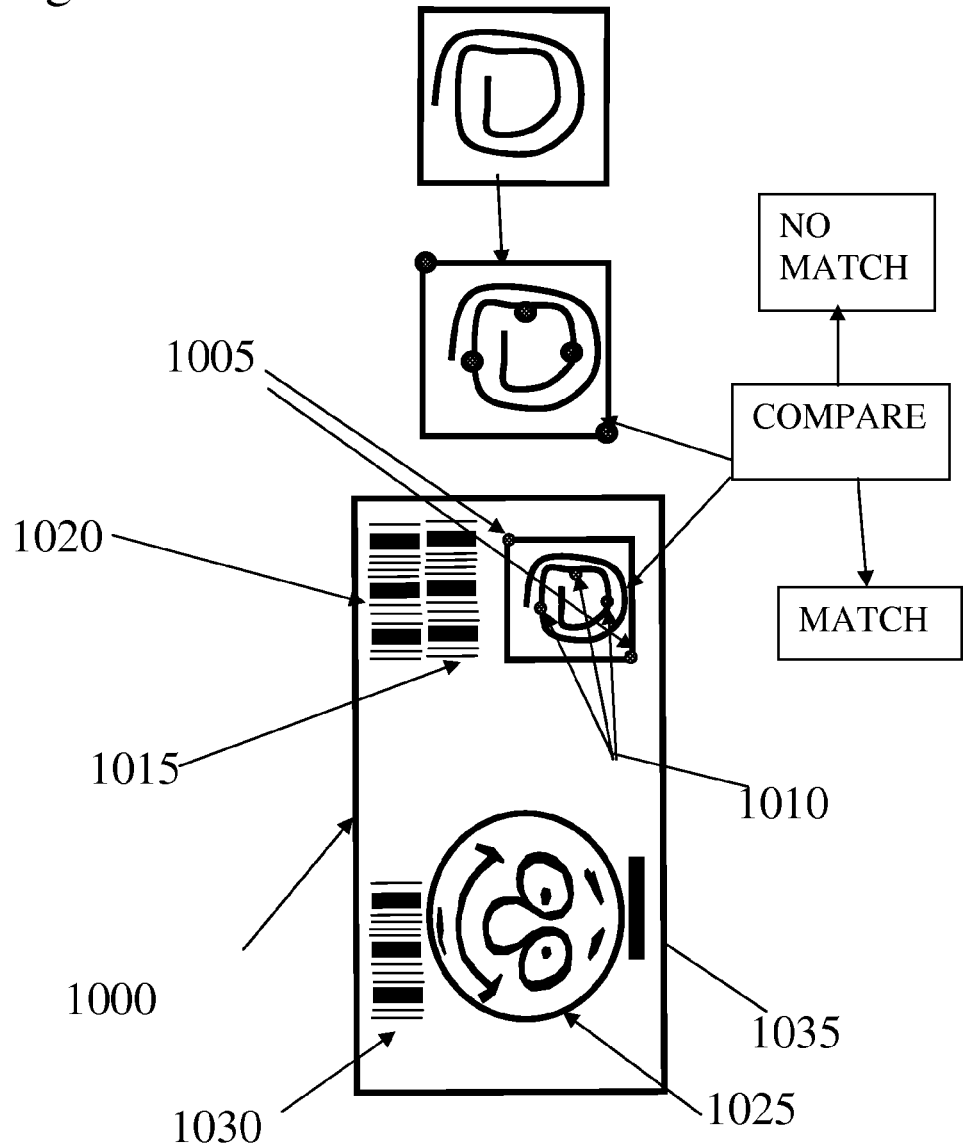
FIG. 2 is an illustration comparing the security mark on the security card with biometric information of the individual.

The fingerprint verification process for the card has two components. As seen in FIG. 2, the first part is capturing the scanned fingerprint 2010 using the same algorithm that is used to create the fingerprint data for the fingerprint shown in FIG. 1A. This algorithm produces data with respect to the minutia with regards to location and minutia type (bifurcations or termination).

The fingerprint data on the card 1000 is then read, with both the reverse image alignment points 1010 and the serial codes 1015 and 1020 providing a system of verification, and both the relative location information from the reverse image alignment points 1010 and the serial code information 1015 and 1020 containing location and minutia type data. This verification system uses the location of minutia translated from the reverse image alignment points 1010 and compares it to location data that is part of the serial code 1015. This provides an internal check of the card information based on location data. Then the serial code information of both the minutia location and type is compared to the data generated by the fingerprint capture algorithm and the identity is verified or not verified.

By using the multi-step process of minutia location verification on the card with respect to both the reverse image alignment points 1010 and serial coded information 1015 and 1020, the data contained on card 1000 is validated and forgery prevented. As stated above, a conductivity meter can be used to scan over regions of the card to determine the position of the deposits of conductive materials. When these conductive regions are deposited in a line, the existence of a conductive region can be interpreted as a (1), and the absence of a conductive region can be interpreted as a (0), making binary coding possible. For the card to be forged the forger would have to insert information between the serial recorded data 1020 or remove the serial encoded information 1020, thereby destroying the card. Since the information is recorded on the conductive layer the forger would have to remove and replace the conductive material with the same material or insert new information between the serial data 1020 in multiple locations and replicate the security resistor 1035. The security resistor 1035 is also checked with the reading of the card 1000 to insure that it is a valid card. The combination of serial recorded data 1015 of minutia type and location and the second minutia type serial information 1020 capture and security resistor 1035 eliminates the means to adulterate the card with forged biometric information. The two means of writing the minutia type plus the security resistor make aldutrading the card impossible. One would have to remove and add material and the resistor would have to be changed the formulation problems to match the card stock and all the resistances would be impossible. To forge the fingerprint identity the individual would have to recreate the plot on the conductive material and new points would have to match the old points' relative locations 1010 and the data on the serial codes 1015 and 1020 would have to match the new plotted location data points.

Figure 3:
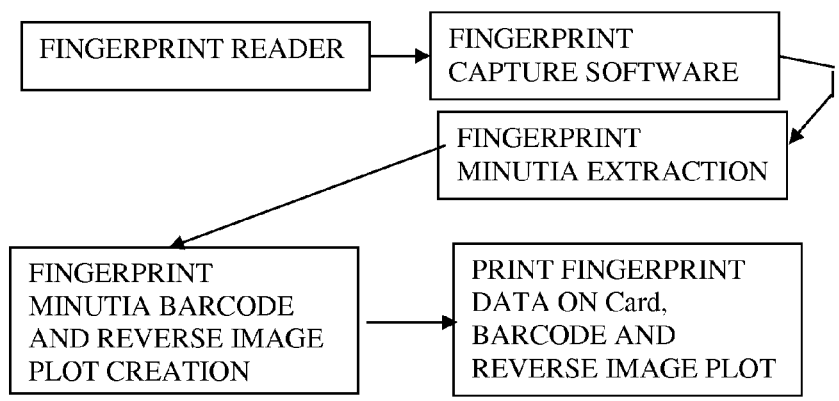
FIG. 3 is a flow chart illustrating a process of writing the security marking according to the invention.
Figure 4:
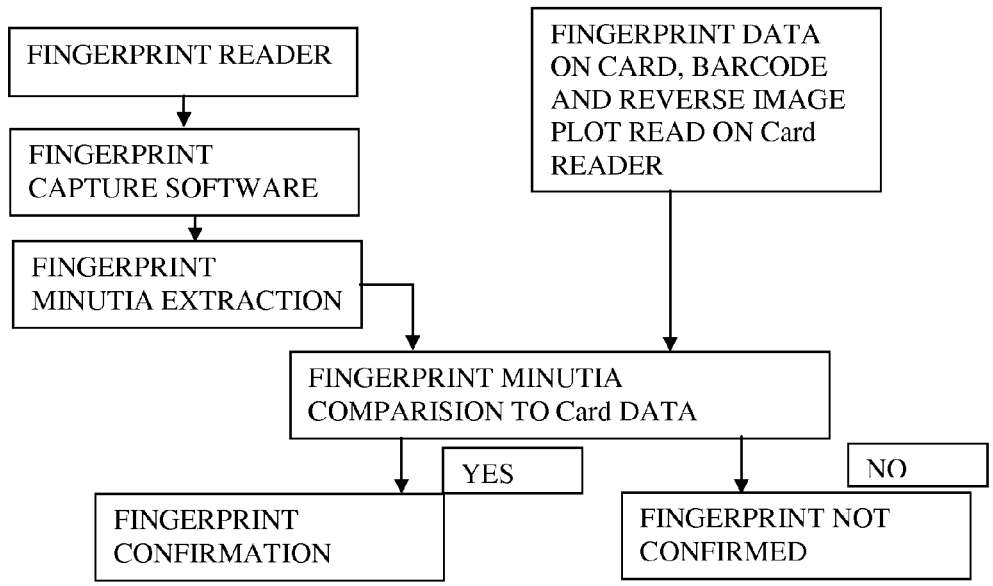
FIG. 4 is a flow chart illustrating a process of reading and comparing the security marking according to the invention.

The flow chart of the biometric capture processes is shown in FIG. 3 and the biometric comparison and verification process is shown in FIG. 4.

Figure 5:
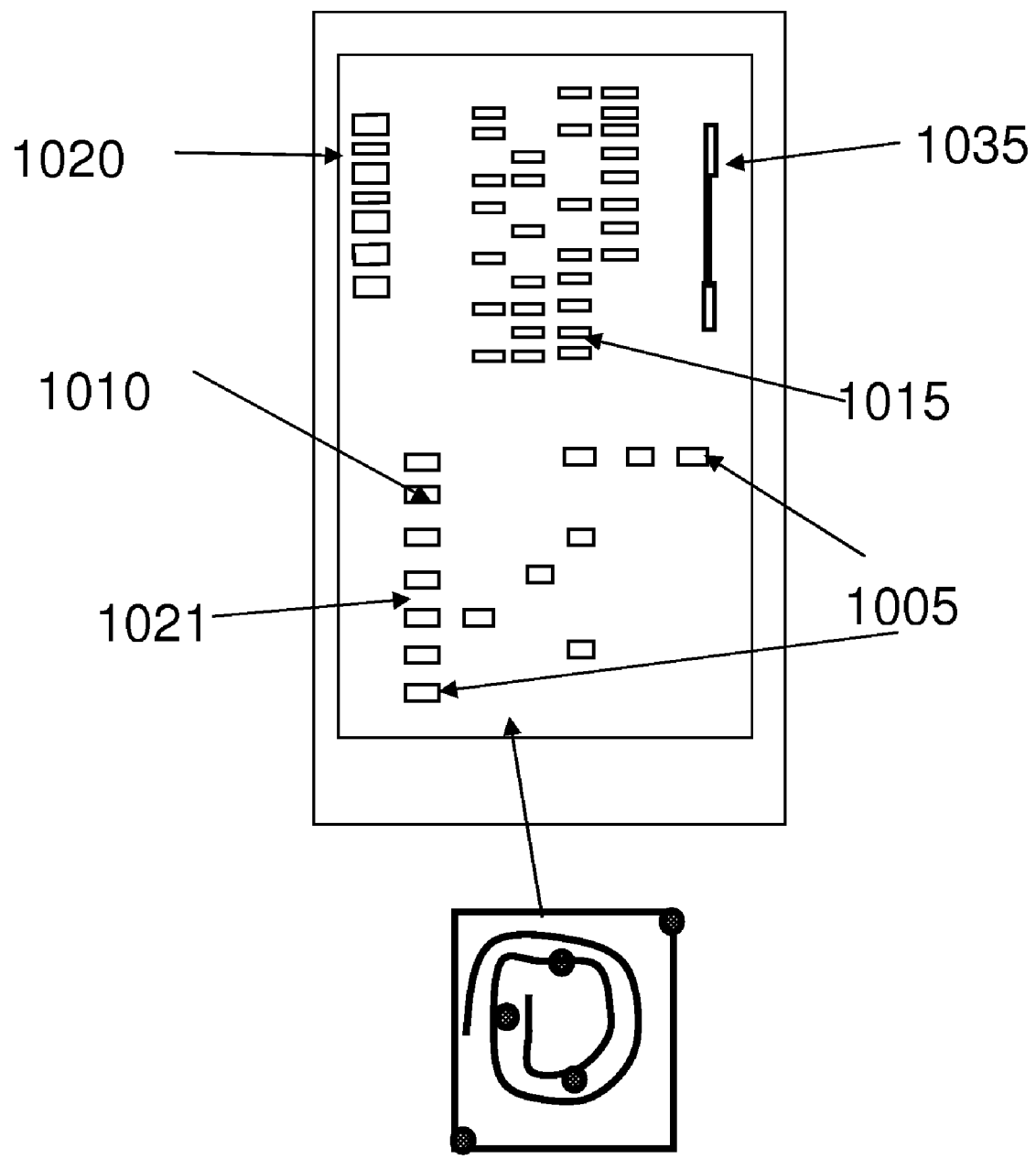
FIG. 5 is a schematic showing a pattern of conductive material sections representing a serial code on a security card.

A preferred system of how the card operates is shown in FIG. 5.

First a card reader (e.g.: a conductivity meter) reads codes 1015 and 1020 and records fingerprint location and minutia type. (Codes 1015 and 1020 represent physical removed or missing deposits of conductive materials on the surface of the card). The conductivity card reader then compares the minutia order to the code 1021 information and the next step is to compare a pixel map of the fingerprint minutia data to the minutia locations code 1010 on the card.

This prevents forgery or adulteration of the card because minutia location code 1010 stores in the pixel code order the minutia location and code 1022 stores the same location data written in a serial manner. The fingerprint minutia site information is captured in two different and separate codes which prevents forgery because if they do not match then the card is not correct. A forger could add pixel and information to the pixel code 1010 however the serial code 1022 will not match. Therefore, it is not possible for a forger to modify the card by changing the code 1010 because the minutia type code 1022 is written sequentially. As a result of the above, it is not possible to modify code areas 1010, 1015, and 1022 and get matches when the codes are read because of the three independent code verifications.

The encoding for the identification card can be accomplished as follows.

As shown in FIG. 5 one method to create the serially encoded data 1015 and 1010 and 1022 is by capturing biometric information. In the example below a fingerprint is used but a similar method can be-used for any biometric information desired.

Fingerprint minutia site information is captured and converted to a pixel code 1010. The pixel code fingerprint minutia location information captured in pixel code 1010 allows the card to capture up to 25 minutia points. The pixel code 1010 code has alignment points 1005 marked in the conductive material.

Second is the lower serial code 1021 as shown in FIG. 5 where the minutia type (bifurcation or termination) which are located in pixel code 1010 is listed in order from left to right and top to bottom as plotted in pixel code 1010. The minutia locations and type are also written to the serial code 1015 on the card. The minutia type are written again in a different serial code 1020 on the card.

Figure 6:
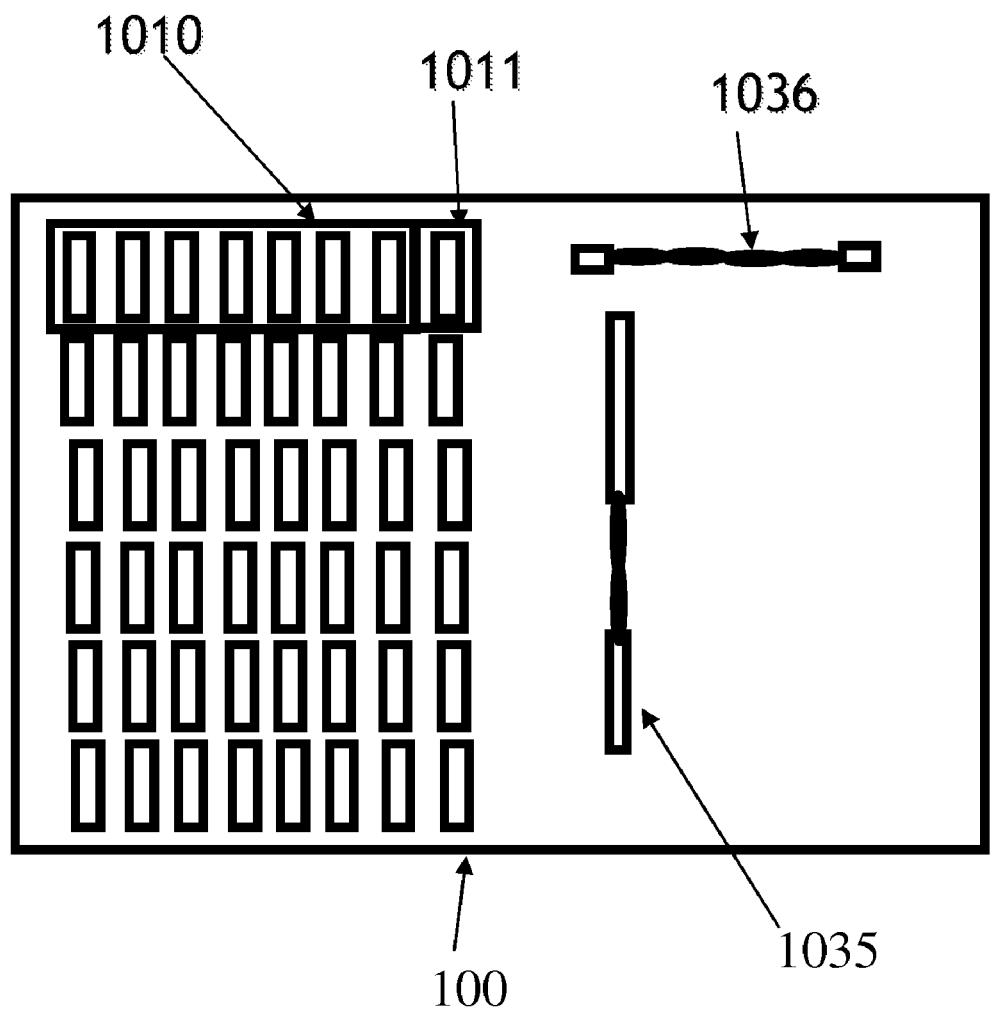
FIG. 6 is a schematic showing an alternative serial code.

FIG. 6 shows an alternate embodiment of card 100 with code 1010 representing minutia location 1010 and code 1011 representing minutia type. As illustrated, code 1010 may comprise up to 7 regions where conductive materials are deposited or removed or missing on the surface of the security card. One or more of these regions may not have conductive material deposited thereon, making coding possible. For example, a conductivity meter scanning along code 1010 will determine whether conductive material is deposited or removed at each of these 7 regions. A minutia check bit resister 1036 provides a check bit sum plus one for the number of minutia points. The check resistor 1035 provides the relative basis for the minutia check bit resister 1036.

The security card can also contain security code 1030, picture 1025 (not shown in FIG. 6) and security resistor 1035. The security resistor 1035 comprises conductive material that may be etched or printed on card 1000 having a predetermined resistance to provide a resistive identifier for the card. Specifically, the resistance of resistor 1035 has to match within a tolerance of the acceptable resistance and configuration for a particular class of cards.

Figure 7:
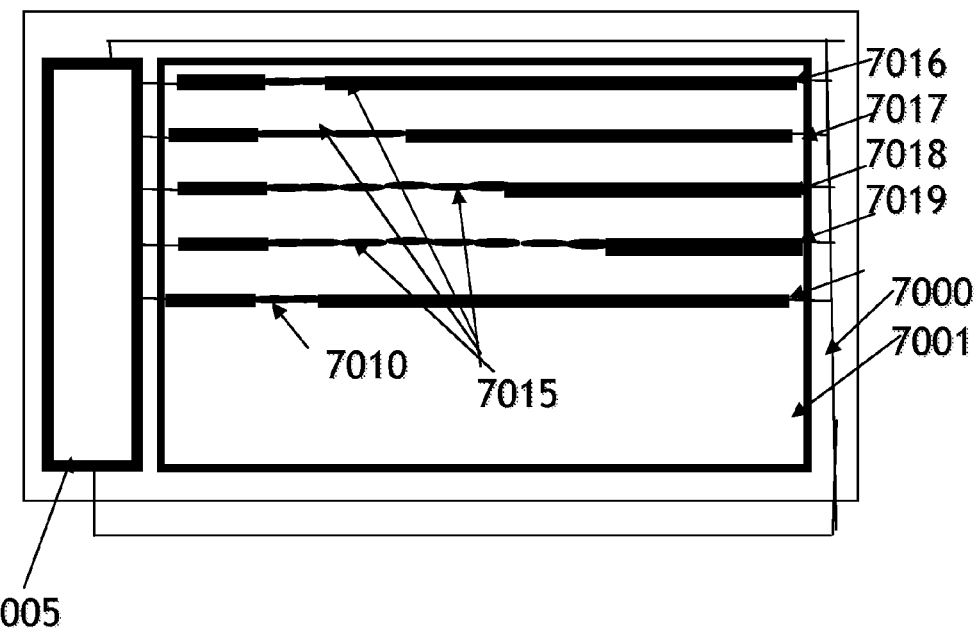
FIG. 7 is a schematic of pattern of conductive material sections representing an analog code on a security card.

Alternatively the conductive material encoding can be integrated into a traditional RFID device such as an identity card as seen in FIG. 7. A layer of conductive material 7001 is applied to the card 7000. Embedded in the card 7000 is a radio frequency identification device (RFID) 7005 which can be a microprocessor or ASIC (application specific integrated circuit). The conductive layer 7001 can be etched so that there is a reference resistor 7010 and a series of information resistors 7015 etched on the card. The reference resistor 7010 provides the ASIC 7005 the reference resistance and the information resistors 7015 are arranged such that the information contained in the conductive material is readable by testing the resistance of the applicable encoded line of information resistors 7015. For example, if the information "1234" was to be encoded on the card the reference resistor 7005 would be etched in the reference 7010 trace. The first information line 7016 would have a single information resistor 7015 etched in the conductive material, the second information line 7017 would have a two information resistors 7015 etched in the conductive material, the third information line 7018 would have a three information resistors 7015 etched in the conductive material, the fourth information line 7019 would have a four information resistor 7015 etched in the conductive material. Alternatively the resistance in each information line could be written in reverse logic where the reference resistor 7010 is high and the information resistance lines (7016, 7017, 7018, 7019) are lower by an amount indicating an appropriate identification value. The layer 7001 of conductive material can also be formed such that the antenna for the RFID device is formed directly into layer 7001 from the same conductive material as each information line.

Figure 8:
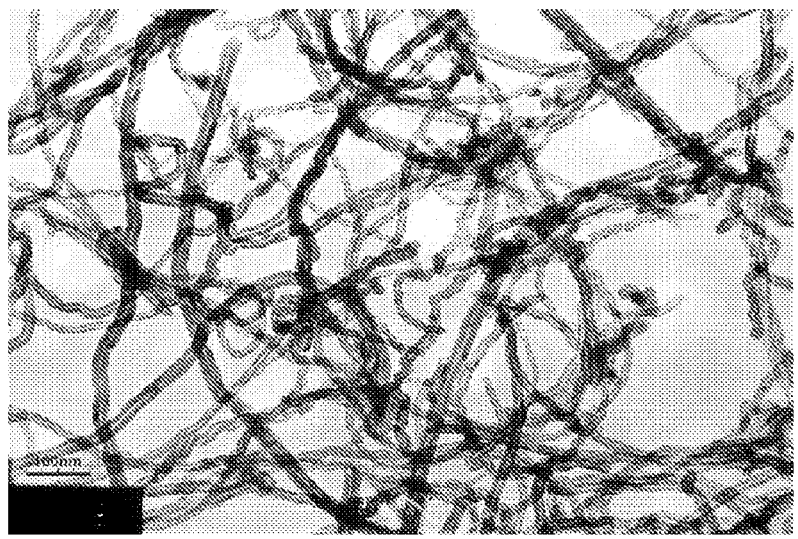
FIG. 8 is a representative SEM image of single wall carbon nano tubes.

FIG. 8 shows an SEM of single wall nano tubes which can be used to form the conductive layer of the invention.

Figure 9:
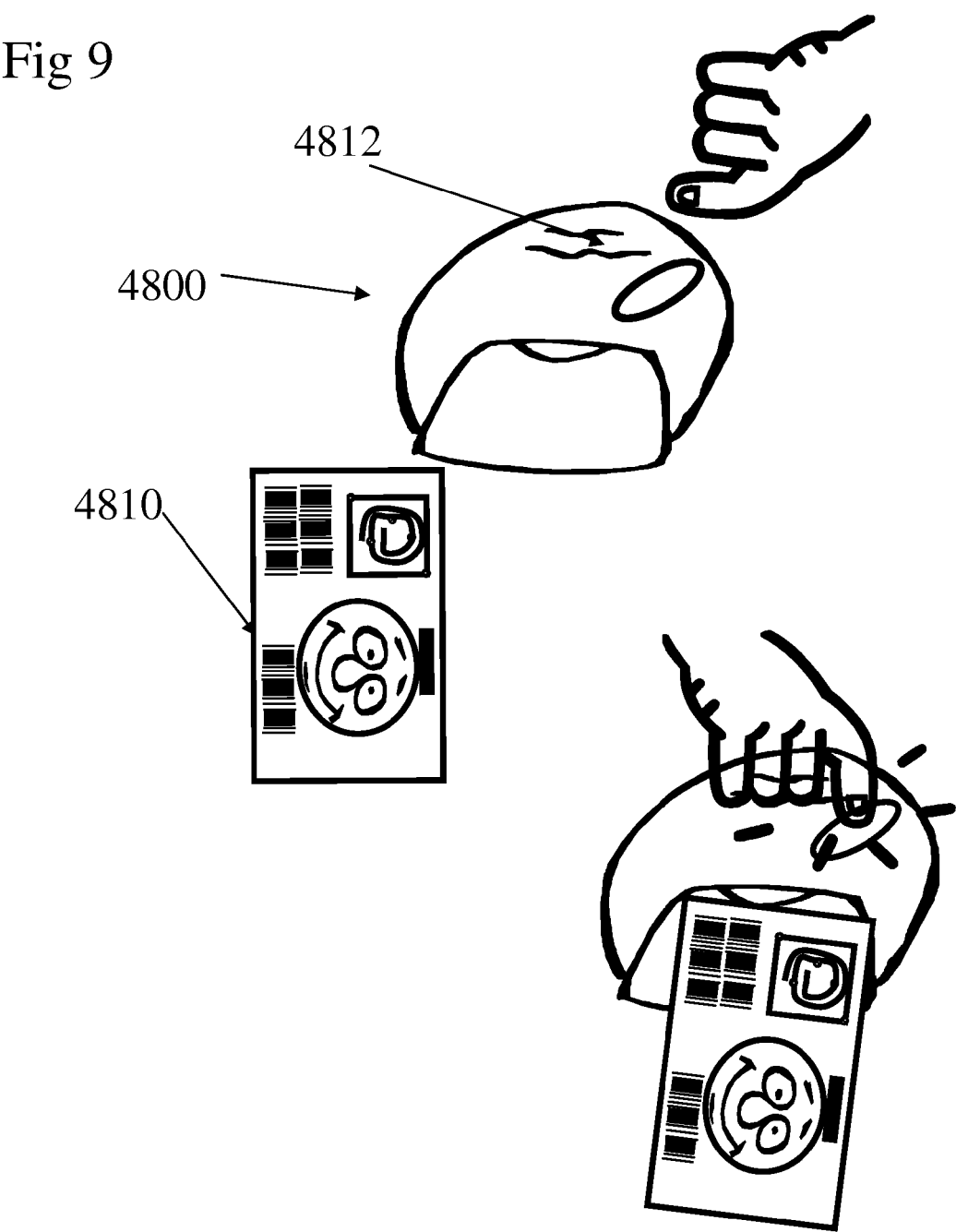
FIG. 9 is a schematic of a security card computer access device.

FIG. 9 shows an identity card according to the present invention used with a computer system. The conductive card 4810 can be preprinted with an identification sequence which is then used in a computer access device 4800. The access device 4800 can plug into the USB or serial post of the computer (not shown) that contains contacts for reading the card and the data encoded in a conductive layer thereon. The data encoded in the conductive layer is used to store a biometric signature such as a fingerprint. The fingerprint would be captured by the fingerprint reader 4812 attached to the computer or built into the computer access device. The computer access device memory (i.e.: the data encoded in the conductive layer) would be written at the point of issuing with the individual biometric information and that would be correlated to the card identifier. Therefore the user is identified by the card which has a unique ID and their unique fingerprint. This would permit access to a LAN, VPN or system access depending on the application.

Alternatively the conductive card can be printed with biometric information which is then used in a computer access device FIG. 9. The access device 4800 can plug into the USB or serial post of the computer and it contains contacts for reading the card 4810. The card is used to store a biometric signature such as a fingerprint. The fingerprint would be captured by the fingerprint reader attached to the computer or built into the computer access device. The card in the computer access device would be written at the point of issuing with the individual biometric information and when used in a reader the information would be correlated between the card and that read at the point of access. Therefore the user is identified by the card which has a unique fingerprint written to the card and the unique fingerprint read at the access device. This would permit access to a LAN, VPN or system access depending on the application.

Figure 10:
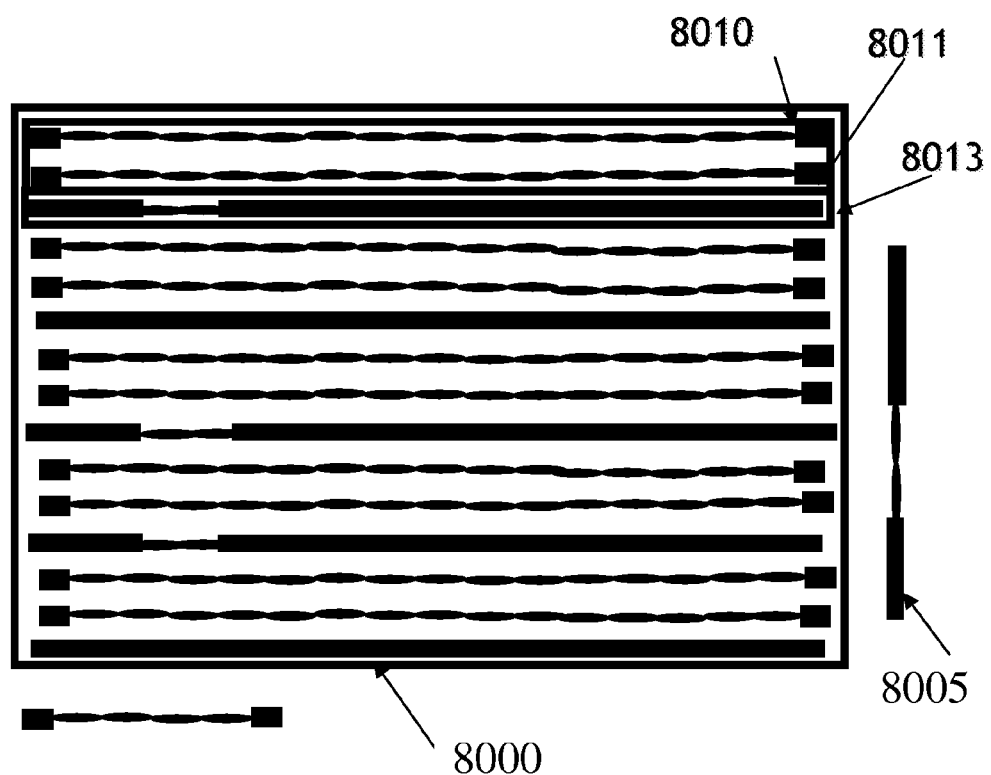
FIG. 10 is a schematic of a security card that holds data in a pattern of conductive material sections representing analog resistance values printed on a card.

FIG. 10 shows an alternative embodiment for an identity card without an RFID device. The card 8000 contains verification resistor 8005 and the minutia location is contained in resistor traces 8010 and 8011. The minutia type is written in resistor trace 8013. This is replicated to accommodate as many minutia points as required to identify the individual. A minutia check bit resistor 8036 is encoded on the card to provide check bit information for the number of minutia recorded on the card. The reference resistor 8035 is encoded on the card to give the reference resistance. The conductive material can also be formed such that the antenna for the RFID device is formed from the same conductive material as the each information line.

In an alternate embodiment the encoding means is customized for gaming applications. In a similar coding method as used in the biometric coding application and using a typical gaming card deck as an example the card deck information is converted into a pixel code. The system has redundant encryptions and this eliminates the possibility of forgery and requires the card reader to initiate start of game and end of game. Start of game is when the shoe or shuffler is loaded and end of game is at the end of the playable cards or can be signaled by the dealer. The wrapper for each deck has the card deck code on it and that is entered into the card reader to allow it to validate the card deck. This provides a machine readable only identifier that is tamper resistant and not readable by optical means.

Figure 11:
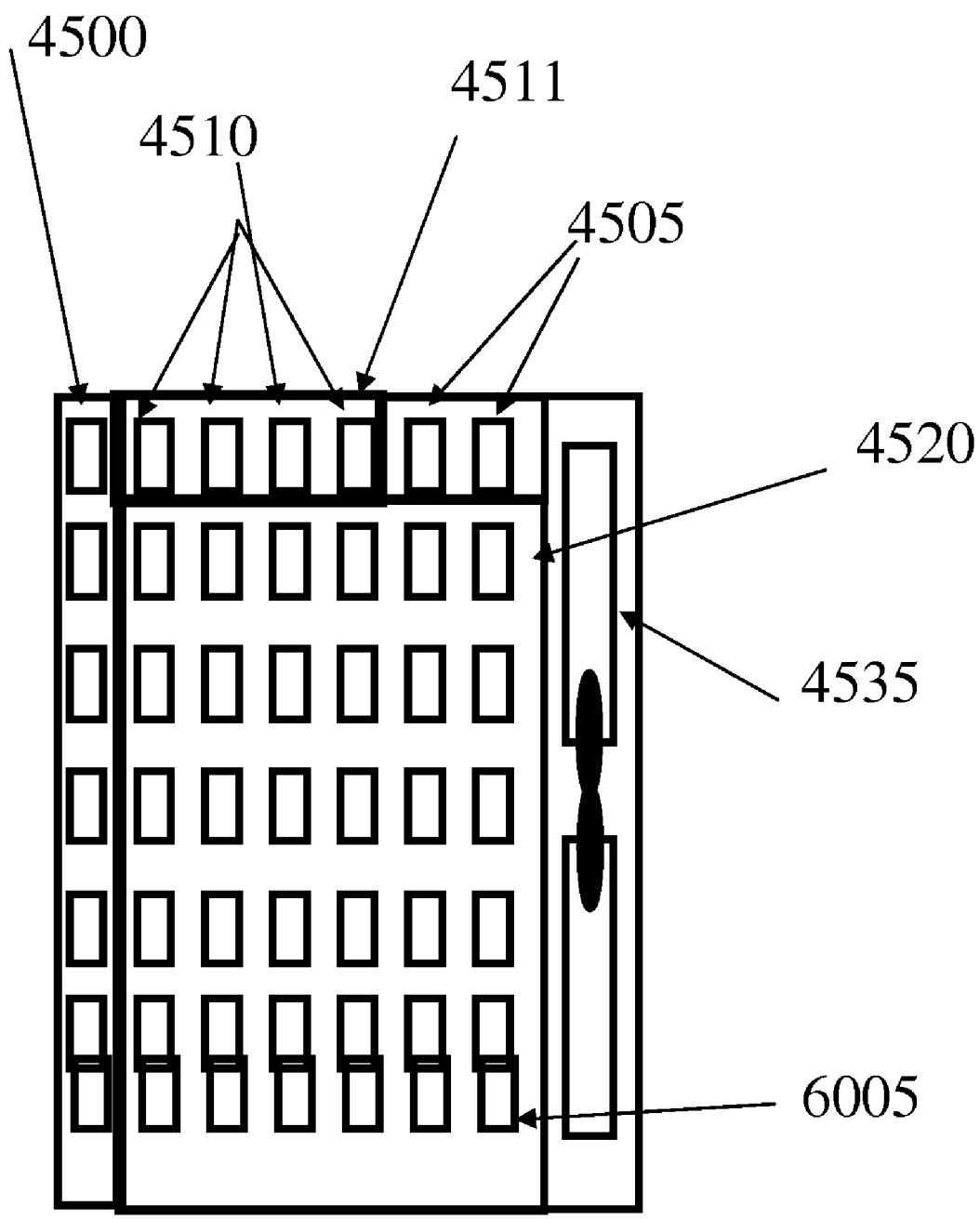
FIG. 11 is a representation of a playing card having sections with conductive materials positioned thereon in a pattern to represent a value pixel code information which is converted to a 7.times.7 pixel code.

As shown in FIG. 11 a standard playing card is provided. A pattern of conductive material is applied directly to the face of the playing card, with the pattern encoding information therein. Card value pixel code information can be converted to a 7.times.7 pixel code 6005, which can represent 52 cards and a 36 binary deck identifier. There is a check bit column 4500 that sums each line of the encoding rows so that the ability to forge the information is minimized. Having a check bit for each line makes the security marking hard to forge since each line would have to have two marks added to the line for the bit to be out of sequence.

In addition, there is a lower binary code where the deck identifier 4520 is stored in a 36-2d binary code. This allows a 36 bit number to be the deck identifier. This identifies the deck of cards a casino could have each deck identified a 36 bit number means they would change numbers over only ever 100 years.

The card identifier 4511 is a 4 bit binary code for card value made up of bits 4510 and a two bit binary code 4505 for card suit.

How the Playing Card Information Works.

First the card reader reads the card identifier 4511 and card deck information 4520. The check bits 4500 are compared and then the card deck information 4520 is compared with the valid card deck information stored in the card reader. If the card deck identifier 4520 is different than the card deck identifier that was entered from the card deck wrapper then the card reader alarm states "bad deck information". Then the value of the card 4510 is checked against the cards dealt register in the card reader. If the same card and same deck have already been dealt during that game then the card reader alarms; if not, then the cards are playable. The reader memory then records deck and card information and position information so that winning hands cards can be verified electronically. This can be done with a sensor system or manual input to where each player is in the table position.

Because of the card deck information 4520 and the card value information 4511 combined with the check bit 4500, the ability for a foreign card to be inserted into a game is virtually impossible and the data storage checks for card playing order and cards in play eliminate the switching of cards or movement of cards between players.

Figure 12:
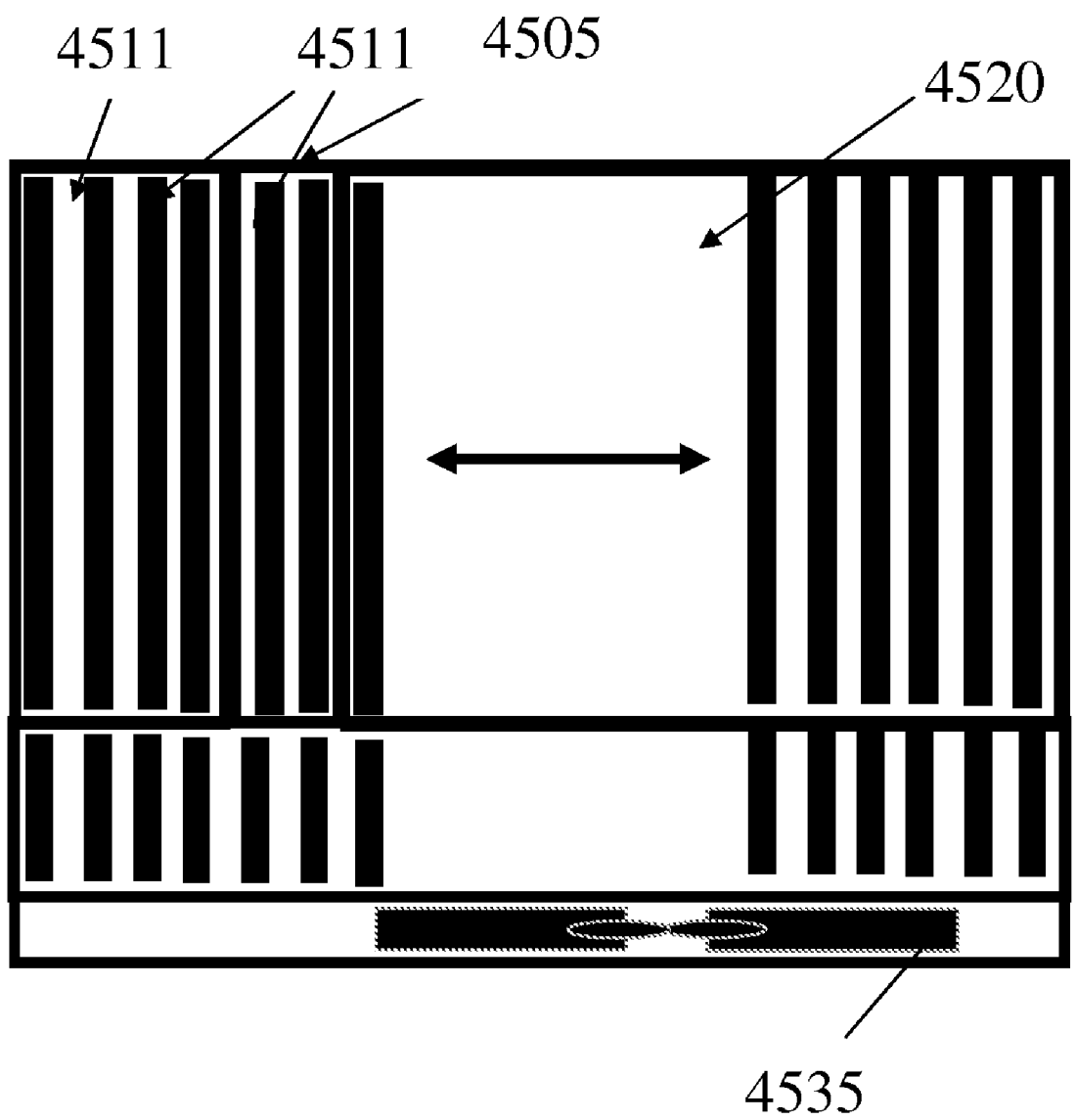
FIG. 12 is a representation of a card value pixel code information which is converted to a bar code.

FIG. 12 illustrates a playing card encoded with resistance codes. The card identifier 4511 works with a 4 bit binary code for card value 4510 and a two bit binary code 4505 for card suit. The deck identifier 4520 is stored in a resistance code. This allows a 36 bit number to be the deck identifier. The reference resistor 4535 is used to verify the conductive material (which is read by the conductive reader that verifies the resistance which is used in the interpretation of the code) the same as all the other analog codes that are converted to digital by interpretation of the reference resistor. A check bit 4520 can be used to provide a timing marks as well as a check sum.

Figure 13:
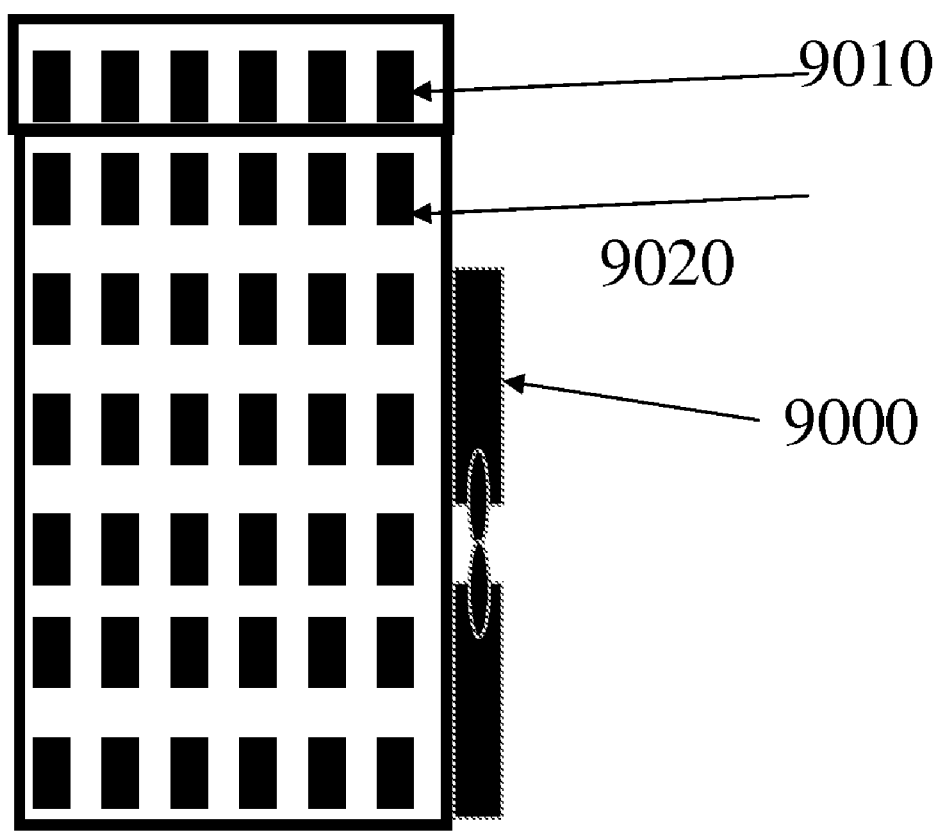
FIG. 13 is a representation of a security tag with pixel code information.

FIG. 13 is a representation of a security tag with pixel code information. The tag can be as simple as a single conductive reference resistor 9000 where the identity is determined by the resistance of resistor 9000 or it can be more complex and contain manufacturers code 9020 and article ID 9010.

Figure 14:
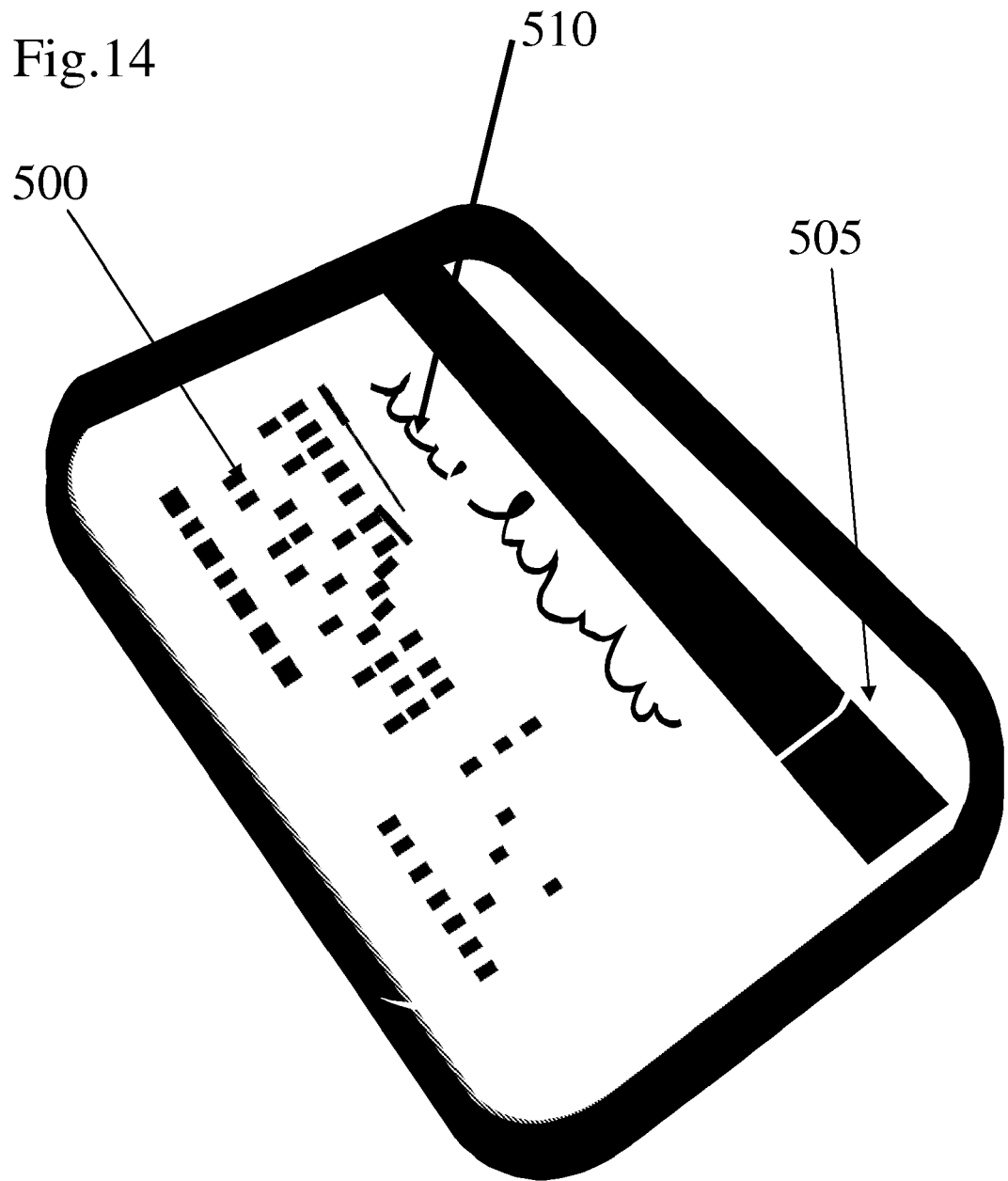
FIG. 14 is a representation of a security card having a magnetic strip with security markings such as a security code or a picture integrated therein.

FIG. 14 is a representation of an encoded security marking 500 including a picture or signature 510 integrated into the card as well as a magnetic strip 505.

In further embodiments of the invention, other biometric information can be encoded such as retinal scans, palm prints, etc. The fingerprint methods are examples and are detailed here for reference.

In a further embodiment of the invention the pattern of conductive material deposits in, or removed from, the conductive coating is used to determine if the document or gaming piece is valid by the reader testing the resistance level of a portion of the coating or over the whole area. This can be done by forming a resistive trace in resistor 9000 in the card with a resistance reader testing the resistive trace. This takes into account the ohms per square relationship of the material. The same effect can be done by applying three voltages to a card, such as 1, 10 and 100 volts. Because of the phenomenon of electron jumping between the nano tubes the resulting ohm law result is different. Ohm's law is most commonly represented by the following equation $E=IR$.

In a further embodiment of the invention the layer of conductive material deposits are replaced with a conductive film and the encoding ID punched into the film. A conductive film like the Bayer conductive film or Ocean Plastics Co., Ltd. conductive plastic film—(OCC FILM) can be used and the code punched in the film prior to laminating.

In a further embodiment of the invention the conductive layer is applied in a two step process. The conductive nano tube coatings can have nano carbon or nano metals in the coating. Additionally the nano dips can be reformulated to allow a one dip coating or a two dip coating.

In a further embodiment of the invention the conductive layer is applied in a one step process where the conductive nano tube coatings can have nano carbon or nano metals in the coating. Additionally the nano dips can be reformulated to allow a one dip coating or a two dip coating.

In a further embodiment of the invention the conductive coating with either one or two part application is replaced with a conductive film. The encoding ID is punched into an over laying film and the film is adhered to the conductive layer.

In a further embodiment of the invention the conductive coating with either one or two part application is replaced with a conductive film. The encoding ID is printed with non conductive ink over the film so that it adheres to the conductive layer forming the encoded area.

In a further embodiment of the invention the conductive material can be mixed with fluorescence or infrared dye and the code is in fluorescence dye bearing material. This allows non contact (e.g. optical) reading of the card while the conductive contact reading of the conductive material verifies the card authenticity.

In a further embodiment of the invention the conductive material can be mixed with fluorescence dye with the code being in the fluorescence dye bearing material. This allows non contact (e.g. optical) reading of the card while the conductive contact reading of the conductive material verifies the card authenticity.

In a further embodiment of the invention the encoding is performed with binary numbers.

In a further embodiment of the invention the encoding is performed with bar codes.

In a further embodiment of the invention the binary numbers are written in fluorescence dye. If a fluorescence dye was used then the system would not require a contact reader. The digital encoding method could be read by the fluorescence dye reader and the system would be a non contact encoding method not requiring the conductive nano tube material.

In a further embodiment of the invention the binary numbers are written in infrared dye. If an infrared dye was used then the system would not require a contact reader. The digital encoding method could be read by the infrared dye reader and the system would be a non contact encoding method not requiring the conductive nano tube material.

In a further embodiment of the invention the bar codes are written in infrared dye. If an infrared dye was used then the system would not require a contact reader. The digital encoding method could be read by the infrared dye reader and the system would be a non contact encoding method not requiring the conductive nano tube material.

In a further embodiment of the invention the binary numbers are encoded using the same printing ink as the back ground ink. This creates a virtually invisible conductive code. A conductive code reader would read the digitally encoded signature and determine the values for use in the system.

In a further embodiment of the invention the bar codes are written in the same printing ink as the back ground ink with conductive material alloyed into the ink. This creates a virtually invisible conductive code. A conductive code reader would read the digitally encoded signature and determine the values for use in the system.

The encoding can also be expanded to the marking of critical documents by either printing or engraving an encoded signature to the document once it is printed with the conductive material.

The system can also be extended to use the conductive coating material and mix it in the formation of the document to create a conductive document. The amount of conductive material added to the base extrusion will be representative to the conductance of the document and this can be used as a marker to verify the document such as currency, retail packaging, or securities documents.

It is impossible to forge the information present on the invention with the conductive materials because the forger must match the resistivity of the original coating. The multiple stage identification algorithm eliminates the ability to insert identification within the code.

Another security issue that has not been effectively handled by existing marking technology is the grey market diversion and authentic licensed material. Grey market material is a problem in the high value consumer goods market were manufacturers distribute the products at different price points to different markets due to various pressures such as price controls in a market. Authentic licensed materials such as sports logo materials are regularly copied and the appropriate licensing fees not paid. A better way of discretely identifying the product is needed to minimize these problems.

In accordance with the present invention, a security marking can be used in packaging applications such as tamper proof seals or package identification to assist manufacturers in identifying their products. For example, as seen in FIG. 13 the pattern of conductive marking 9000 can be formed so as to encode information such as manufactures code 9020 and article ID 9010, lot, destination (country to be exported to), manufacturing date, or other useful information so that a manufacturer or retailer can quickly determine if the product is "grey market" or authentic. This marking is not readable to the consumer and when a transparent coating such as an ink like the Acheson Electrodag 427 or conductive films, coatings or inks such as described in U.S. patent application 2002/0143094 entitled Polymer nanocomposites and methods of preparation, Conroy, Jeffrey L.; et al.; U.S. patent application 2002/0035170 entitled Electromagnetic shielding composite comprising nano tubes Glatkowski, Paul; et al.; U.S. patent application 2002/0180077 entitled Carbon Nano Tube Fiber-Reinforced Composite Structures for EM and Lightning Strike Protection Glatkowski, Paul; et.; U.S. patent application 2003/0008123 entitled Nanocomposite dielectrics Glatkowski, Paul; et al.; U.S. patent application 20030164427 entitled ESD Coatings for Use With Spacecraft Glatkowski, Paul; et al.; and U.S. patent application 2003/0122111 entitled Coatings Comprising Carbon Nano Tubes and Methods for Formning Same Glatkowski, Paul; et al.; all included herein by reference, are used, then determining the authenticity or whether the product has been diverted from another market is easily accomplished. The nano tubes used by the aforementioned conductive materials can be selected from the group consisting of single-walled nano tubes (SWNTs), double-walled nano tubes (DWNTs), multi-walled nano tubes (MWNTs), and mixtures thereof.

Alternatively the conductive material can be coated on thread of substrate that is used to form the logo on apparel or be incorporated in currency. The conductivity of the logo is then used by the manufacturer to determine if the apparel was made for that market or if it was diverted. The reader testing the resistance level of a portion of the coated logo or over the whole area is used to determine the authenticity and if it was diverted from another market. The conductivity can be pre-set to different amounts corresponding to various destinations (territories) and for authenticity of the item.

Alternatively the conductive inks or coatings can also be impregnated or printed onto the primary packaging material. The ink or coating would be formulated to provide a specific resistance so that the product could be easily identified by resistive readings of the package.

Alternatively the conductive inks or coatings can also be printed onto a tag and the tag sewn into a cuff or fold of the apparel or product. The conductive inks or coatings would be formulated to provide a specific resistance so that the product could be easily identified by resistive readings of the tag.

Alternatively the conductive material can be mixed with fluorescence or infrared dye and the code is in dye bearing material. This allows non contact reading of the card while the conductive contact reading of the conductive material verifies the card authenticity.

Other embodiments and uses of the invention will be apparent to those skilled in the art from consideration of the specification and practice of the invention disclosed herein. All references cited herein, including all publications, U.S. patents and patent applications including the priority document, are specifically and entirely incorporated by reference.

What is claimed is:

1. A gaming card having a security feature incorporated therein, said gaming card comprising:
    a gaming card; and
    a conductive material comprising carbon nanotubes located on said gaming card, said conductive material being formed as a patterned layer comprising identifying indicia;
    wherein said patterned layer of identifying indicia is contactable by and readable by a conductivity meter to provide a resistance value of at least a portion of said identifying indicia to impart a security feature to said gaming card.

2. The gaming card of claim 1, wherein said conductive material comprises a layer of translucent material applied to said gaming card.

3. The gaming card of claim 1, wherein said identifying indicia is encoded to define a code in which readable information is formed by removing said conductive material to form the identifying feature.

4. The gaming card of claim 3, wherein said code is a binary representation of data.

5. The gaming card of claim 3, wherein said code is a barcode representation of data.

6. The gaming card of claim 1, wherein said identifying indicia is formed to provide representations of information based on a resistance reading of said conductive material.

7. The gaming card of claim 1, wherein said identifying indicia is a representation of gaming information.

8. The gaming card of claim 1, wherein said identifying indicia is a representation of security information.

9. The gaming card of claim 1, wherein said conductive materials are nanotubes selected from the group consisting of single-walled nanotubes (SWNTs), double-walled nanotubes (DWNTs), multi-walled nanotubes (MWNTs), and mixtures thereof.

10. The gaming card of claim 1, wherein said patterned layer has a surface resistance of less than about 25,000 ohms/square.

11. The gaming card of claim 1, wherein said patterned layer is formed by a method selected from the group consisting of spray painting, dip coating, spin coating, knife coating, kiss coating, gravure coating, screen printing, ink jet printing, and pad printing.

12. The gaming card of claim 1, wherein said conductive material comprises a dispersion of a plurality of nanotubes, said nanotubes having outer diameters of less than 15 nm.

13. The gaming card of claim 12, further comprising a polymeric material incorporated with said conductive material, wherein the polymeric material comprises a material selected from the group consisting of thermoplastics, thermosetting polymers, elastomers, conducting polymers, and combinations thereof.

14. The gaming card of claim 1, wherein said conductive material is selected from the group consisting of aluminum, antimony, beryllium, cadmium, chromium, cobalt, copper, doped metal oxides, iron, gold, lead, manganese, magnesium, mercury, metal oxides, nickel, platinum, silver, steel, titanium, zinc, tin-indium mixed oxide, antimony-tin mixed oxide, fluorine-doped tin oxide, aluminum-doped zinc oxide, and combinations and mixtures thereof.

15. The gaming card of claim 1, wherein said conductive material comprises carbon nanotubes and at least one of a conductive film and ink, and wherein a non conductive layer is placed on said conductive material, said non conductive upper layer being selectively relieved to allow access to said conductive material, thereby providing a non-conductive encoding means and a conductive encoding means.

16. The gaming card of claim 1, wherein said conductive material comprises an inorganic material selected from the group consisting of aluminum, antimony, beryllium, cadmium, chromium, cobalt, copper, doped metal oxides, iron, gold, lead, manganese, magnesium, mercury, metal oxides, nickel, platinum, silver, steel, titanium, zinc, tin-indium mixed oxide, antimony-tin mixed oxide, fluorine-doped tin oxide, aluminum-doped zinc oxide and further comprising conductors, fluids, gelatins, ionic compounds, semiconductors, solids, surfactants, and combinations and mixtures thereof.

17. The gaming card of claim 1, wherein said conductive material is formed with at least one of a conductive film and ink, and wherein said conductive material is selectively relieved to allow access to non-conductive material, thereby providing a non-conductive encoding means and a conductive encoding means.

18. The gaming card of claim 1, wherein said conductive material is formed with at least one of a conductive film and ink and wherein said conductive material is selectively relieved to allow access to non-conductive material, thereby forming points of resistance to define resistor trace conductive material and providing an encoding means of reading a resistance value of said conductive material.

19. The gaming card of claim 1, wherein said conductive material is formed with at least one of a conductive film and ink and wherein said conductive material is selectively relieved to allow access to non-conductive material, thereby forming points of resistance to define resistor trace conductive material and providing an encoding means of reading a resistance value of an unbroken portion of said conductive material.

20. The gaming card of claim 1, wherein said conductive material is formed with at least one of a conductive film and ink and wherein said patterned layer is printed such that said patterned layer forms a coating over substantially all of said gaming card and wherein a resistance value of said conductive material provides an encoding means of reading a resistance value of an unbroken portion of said conductive material.

21. A multi-layered structure for a security marking for a gaming card, said multi-layered structure comprising:
   a gaming card;
   an electrically conductive film of identifying indicia comprising a plurality of carbon nanotubes having outer diameters of less than 15 nm located on said gaming card; and
   a polymeric layer disposed on at least a portion of said electrically conductive film;
   wherein said electrically conductive film is read by being contacted by a conductivity meter.

22. The multi-layered structure of claim 21, wherein said nanotubes are selected from the group consisting of single-walled nanotubes (SWNTs), double-walled nano tubes (DWNTs), multi-walled nanotubes (MWNTs), and mixtures thereof.

23. The multi-layered structure of claim 21, wherein said plurality of nanotubes comprises substantially single-walled nanotubes (SWNTs).

* * * * *